(12) United States Patent
Boys et al.

(10) Patent No.: US 11,031,826 B2
(45) Date of Patent: Jun. 8, 2021

(54) MAGNETIC FLUX COUPLING STRUCTURES WITH CONTROLLED FLUX CANCELLATION

(71) Applicant: Auckland UniServices Limited, Grafton (NZ)

(72) Inventors: John Talbot Boys, Takapuna (NZ); Grant Anthony Covic, Mount Albert (NZ); Abiezer Tejeda Marquez, Auckland (NZ); Matthew Pearce, Auckland (NZ); James Duncan Deans Gawith, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 488 days.

(21) Appl. No.: 15/510,686

(22) PCT Filed: Sep. 10, 2015

(86) PCT No.: PCT/NZ2015/050139
§ 371 (c)(1),
(2) Date: Mar. 11, 2017

(87) PCT Pub. No.: WO2016/039644
PCT Pub. Date: Mar. 17, 2016

(65) Prior Publication Data
US 2017/0222490 A1    Aug. 3, 2017

(30) Foreign Application Priority Data

Sep. 11, 2014 (NZ) .................................. 631149
Mar. 17, 2015 (NZ) .................................. 706024
(Continued)

(51) Int. Cl.
*H02J 50/70* (2016.01)
*H01F 27/28* (2006.01)
(Continued)

(52) U.S. Cl.
CPC ............ *H02J 50/70* (2016.02); *B60L 53/122* (2019.02); *B60L 53/124* (2019.02);
(Continued)

(58) Field of Classification Search
CPC ................................ H02J 50/70; B60L 53/12
(Continued)

(56) References Cited

U.S. PATENT DOCUMENTS 9,406,436 B2 * 8/2016 Boys ....................... H02J 50/10
9,548,621 B2   1/2017 Asanuma et al.
(Continued)

FOREIGN PATENT DOCUMENTS

JP   2010073976 A    4/2010
JP   2013-537796 A   10/2013
(Continued)

OTHER PUBLICATIONS

"International Application No. PCT/NZ2015/050139, International Search Report and Written Opinion dated Mar. 11, 2016", (Mar. 11, 2016), 7 pgs.
(Continued)

*Primary Examiner* — Richard V Muralidar
(74) *Attorney, Agent, or Firm* — Schwegman Lundberg & Woessner, P.A.

(57) ABSTRACT

Inductive power transfer flux coupling apparatus includes a first coil arranged in a first layer and configured to generate or receive a magnetic coupling flux in a flux coupling region, and a second coil. At least part of the second coil being arranged in a second layer and is configured to generate a magnetic flux that reflects flux from the first coil.

20 Claims, 26 Drawing Sheets

(30) Foreign Application Priority Data

Apr. 1, 2015 (NZ) ........................................ 706614
Apr. 1, 2015 (NZ) ........................................ 706620

(51) Int. Cl.

| | |
|---|---|
| *H01F 38/14* | (2006.01) |
| *B60L 53/122* | (2019.01) |
| *B60L 53/124* | (2019.01) |
| *B60L 53/126* | (2019.01) |
| *H02J 50/90* | (2016.01) |
| *H02J 50/12* | (2016.01) |
| *H02J 50/40* | (2016.01) |
| *H02J 50/60* | (2016.01) |
| *H02J 7/02* | (2016.01) |
| *H01F 27/34* | (2006.01) |
| *H02J 5/00* | (2016.01) |

(52) U.S. Cl.
CPC ........ *B60L 53/126* (2019.02); *H01F 27/2804* (2013.01); *H01F 38/14* (2013.01); *H02J 7/025* (2013.01); *H02J 50/12* (2016.02); *H02J 50/40* (2016.02); *H02J 50/60* (2016.02); *H02J 50/90* (2016.02); *B60L 2270/147* (2013.01); *H01F 27/346* (2013.01); *H01F 2027/2809* (2013.01); *H02J 5/005* (2013.01); *Y02T 10/70* (2013.01); *Y02T 10/7072* (2013.01); *Y02T 90/12* (2013.01); *Y02T 90/14* (2013.01)

(58) Field of Classification Search
USPC ........................................................ 320/108
See application file for complete search history.

(56) References Cited

U.S. PATENT DOCUMENTS

| | | | |
|---|---|---|---|
| 9,935,481 B2* | 4/2018 | Yamaguchi | H02J 50/90 |
| 10,003,217 B2* | 6/2018 | Kuerschner | B60L 53/126 |
| 10,263,466 B2* | 4/2019 | Boys | B60L 53/39 |
| 10,340,077 B2* | 7/2019 | Miyamoto | H02J 50/90 |
| 10,374,459 B2* | 8/2019 | Maniktala | H02J 50/12 |
| 2010/0045114 A1 | 2/2010 | Sample et al. | |
| 2011/0285348 A1 | 11/2011 | Hong | |
| 2012/0025623 A1 | 2/2012 | Low et al. | |
| 2013/0147283 A1 | 6/2013 | Kawano et al. | |
| 2013/0234509 A1 | 9/2013 | Ichikawa et al. | |
| 2014/0197694 A1 | 7/2014 | Asanuma et al. | |
| 2015/0170830 A1* | 6/2015 | Miyamoto | H02J 5/005 |
| | | | 307/104 |
| 2015/0371762 A1* | 12/2015 | Ishizuka | H03H 7/38 |
| | | | 333/32 |

FOREIGN PATENT DOCUMENTS

| | | |
|---|---|---|
| JP | 2013-247822 A | 12/2013 |
| KR | 10-1325549 B1 | 11/2013 |
| WO | WO-2010090539 | 8/2010 |
| WO | WO-2011016736 | 2/2011 |
| WO | WO-2011016737 | 2/2011 |
| WO | WO-2012018269 | 2/2012 |
| WO | WO-2012/029179 A1 | 3/2012 |
| WO | WO-2013062427 | 5/2013 |
| WO | WO-2013/179639 A1 | 12/2013 |
| WO | WO-2016039644 | 3/2016 |

OTHER PUBLICATIONS

"International Application No. PCT/NZ2015/050139, International Preliminary Report on Patentability dated Mar. 23, 2017", (Mar. 23, 2017), 6 pgs.

"Japanese Application Serial No. 2017-534512, Office Action dated Jun. 5, 2019", (w/ English Translation), 23 pgs.

"European Application No. 15794344.0, Communication pursuant to Article 94(3) EPC dated Dec. 18, 2019", (Dec. 18, 2019), 5 pgs.

* cited by examiner

– PRIOR ART –

MAGNETIC FLUX COUPLING STRUCTURES WITH CONTROLLED FLUX CANCELLATION

PRIORITY CLAIM TO RELATED APPLICATIONS

This application is a U.S. national stage application filed under 35 U.S.C. § 371 from International Application Serial No. PCT/NZ2015/050139, which was filed 10 Sep. 2015, and published as WO2016/039644 on 17 Mar. 2016, and which claims priority to New Zealand Application No. 631149, filed 11 Sep. 2014, and which claims priority to New Zealand Application No. 706024, filed 17 Mar. 2015, and which claims priority to New Zealand Application No. 706614, filed 1 Apr. 2015, and which claims priority to New Zealand Application No. 706620, filed 1 Apr. 2015, which applications and publication are incorporated by reference as if reproduced herein and made a part hereof in their entirety, and the benefit of priority of each of which is claimed herein.

FIELD OF THE INVENTION

The invention relates to apparatus for producing magnetic flux from a source of electrical energy or receiving magnetic flux to provide a source of electrical energy. In one application the invention provides a flux coupling structure for inductive power transfer (IPT) i.e. wireless power transfer applications. Such applications may include static and dynamic electric vehicle charging, and low power applications such as charging mobile communications devices.

BACKGROUND

IPT systems are discussed generally and in particular in connection with a powered roadway application in published international patent publication WO 2011/016736. In the system described in that publication, a pad to pad IPT transmission method is used. The pads include a magnetically permeable material such as ferrite in both the transmitter and receiver pad in order to keep the size of those devices as small as possible whilst still transferring the required power. Specific construction of appropriate pads for an IPT roadway application is described in international patent publication WO 2010/090539 which includes an IPT magnetic flux transmitter or receiver, which is referred to in that document (and will also be referred to in this document) as a "Double D" pad design. The Double D pad design has excellent performance, and the pad arrangements constructed according to that design can be made less than 25-30 mm thick so that, if used in a vehicular charging application for example, the receiving pad takes up very little space under the vehicle. Similarly, a transmitter pad according to the Double D design can be made sufficiently thin that it can be placed on or in the floor of a garage, for example, for charging purposes.

The Double D pad design and many other pad structures use magnetically permeable material such as ferrite in order to produce the required flux. Ferrite has disadvantages which include being brittle and expensive. In particular, in a vehicle and roadway environment, ferrite is easily damaged. There is a need for developing an IPT flux coupling apparatus which can tolerate vehicles such as 40-50 tonne trucks driving over it continually when placed in a roadway environment. The disadvantages of ferrite also extend to other applications such as charging other apparatus such as mobile telephones. Reducing the quality of materials such as ferrite will reduce cost, increase robustness and save space. International patent publication WO2013062427 discloses some polarised ferrite-less flux coupling structures. FIG. 1 shows a drawing figure derived from WO2013062427, being a cross section through an embodiment of a magnetic flux coupling structure 1, having a central coil 2 and ends coils 3 and 4. The apparatus produces a field that is predominantly one-sided, for making a magnetic flux available for coupling in a flux coupling region 5 on one side of the structure. Field lines are shown to represent the magnetic flux produced when the coils 2-4 are energised. The density of the field lines is proportional to the magnitude of the field. The field lines 6 represent coupling flux i.e. the magnetic flux primarily intended for coupling with another magnetic structure for transferring power by means of a time varying magnetic field. Field lines 7, however, do not contribute to coupling power and comprise leakage flux.

Efficient maximisation the coupling flux with minimal leakage flux, particularly in the absence of ferrite, is an on-going problem. There is an on-going need to provide solutions that are low cost, robust, and which allow the magnetic fields produced by flux coupling apparatus to be controlled or shaped for both efficiency and safety reasons. In vehicle applications this problem also involves efficiently and safely transferring power wirelessly across the significant and variable airgap between the roadway and the vehicle.

Any discussion of the prior art throughout the specification should in no way be considered as an admission that such prior art is widely known or forms part of common general knowledge in the field. The disclosures of the documents referred to above are all incorporated herein by reference.

OBJECTS OF THE INVENTION

It is an object of the present invention to provide an inductive power transfer flux coupling apparatus or module, or method of wireless or inductive power transfer which overcomes one or more disadvantages of the existing constructions. Alternatively, it is an object of the present invention to at least provide the public with a useful choice.

Further objects of the invention will become apparent from the following description.

SUMMARY OF THE INVENTION

In one aspect the invention provides inductive power transfer flux coupling apparatus, comprising:

a first coil of at least one turn arranged in a first layer, the first coil configured to generate or receive a magnetic coupling flux in a flux coupling region; and a second coil of at least one turn and at least part of the second coil being arranged in a second layer, the second coil configured to generate a magnetic flux opposing the flux from the first coil.

The magnetic flux generated by the second coil can shape the field in the flux coupling region, or reduce leakage flux outside the flux coupling region.

Preferably, the flux coupling region is one one side of the first coil.

In one embodiment the second coil is provided on a side of the first coil opposite to the flux coupling region.

The magnetic flux generated by the second coil can reduce magnetic flux at a side on the apparatus opposite the flux coupling region.

In one embodiment the second coil has fewer turns than the first coil.

The second coil may be shorted i.e. passive. In another embodiment the second coil is driven separately from the first coil.

Preferably the second coil is connected to the first coil but wound in the opposite direction to the first coil. The second coil may have fewer ampere-turns than the first coil.

In one embodiment a third coil of at least one turn is provided, the third coil configured to generate a magnetic flux opposing the flux from the first or the second coil.

In another aspect the invention broadly provides inductive power transfer flux coupling apparatus, comprising:

a first magnetic structure having a first coil of at least one turn arranged in a plane and adjacent a first side of the apparatus, the coil configured to generate or receive a magnetic flux in a flux coupling region beyond the first side of the apparatus; and a second magnetic structure comprising a conductive element configured to generate a magnetic flux opposing the flux from the first coil.

Preferably the first coil is located between at least a part of the conductive element and the first side.

Preferably the apparatus has a second side opposite the first side, the first and second coils being provided between the first and second sides, and wherein the opposing flux generated by the second magnetic structure substantially reduces magnetic flux at or beyond the second side of the apparatus.

In one embodiment a part of the conductive element may intersect the plane in which the first coil is located.

In one embodiment one or more parts of the conductive element are positioned closer to the first coil than one or more other parts of the conductive element.

In one embodiment the first coil and the conductive elements are shaped to have two sides and two ends, and the conductive element is configured so that sides of the conductive element and the first coil are nearer to each other than the ends of the conductive element and the first coil.

In one embodiment the second magnetic structure is electrically connected to the first magnetic structure.

Preferably the conductive element comprises a second coil having at least one turn.

Preferably the second coil is arranged to have fewer ampere-turns than the first coil.

Preferably the second coil has substantially half the ampere-turns of the first coil.

Preferably the second coil is a passive coil.

Preferably the second coil comprises a short circuit.

Preferably the second coil comprises a flat coil.

Preferably the second coil is in a plane substantially parallel to but spaced from the plane of the first coil.

Preferably the first and second coils are substantially co-axial.

In one embodiment the second coil comprises a short circuit and is shaped and positioned relative to the first coil so that sufficient current is induced in the second coil from one region of the first coil to allow control or cancellation of magnetic flux by the second coil at another region of the first coil.

In another embodiment the second coil is electrically connected to the first coil and is shaped and positioned relative to the first coil to allow control or cancellation of magnetic flux associated with one or more selected regions of the first coil.

In one embodiment the second structure may include both an active and a passive conductor. The structures may be arranged relative to each other such that the passive conductor has sufficient current induced therein to provide a required flux pattern.

In another aspect the invention broadly provides inductive power transfer flux coupling apparatus, comprising;

a first magnetic structure comprising one or more of coils, each coil having at least one turn, the coil(s) being arranged in a plane and adjacent to a first side of the apparatus, the coil(s) being configured to generate or receive a magnetic flux in a flux coupling region beyond the first side of the apparatus; and a second magnetic structure comprising a plurality of coils, each coil having at least one turn, and the coils being configured to generate a magnetic flux opposing the flux from the coil(s) of the first magnetic structure, and wherein the first magnetic structure is located between the second magnetic structure and the first side.

Preferably the coils in the second structure comprise solenoidal coils.

Alternatively the coils in each structure comprise flat coils.

Preferably the first and second structure each comprise two or more coplanar coils.

Preferably the coplanar coils are substantially mutually decoupled.

In another aspect the invention broadly provides a method of producing a magnetic flux for inductive power transfer, the method comprising:

producing a magnetic flux using a first magnetic structure comprising a planar coil to provide a field in a power transfer region;

using a second magnetic structure located further from the power transfer region than the first magnetic structure to produce a magnetic flux which opposes the flux produced by the first magnetic structure to thereby control the flux available for power transfer.

In another aspect the invention broadly provides an inductive power transfer apparatus suitable for producing or receiving a magnetic field for inductive power transfer, the apparatus comprising:

a central coil having first and second ends, two flat end coils, one end coil being provided at or adjacent to each end of the central coil, the coils being operable so that when energised the end coils guide magnetic flux through the central coil to provide an arch shaped flux pattern beyond the apparatus for inductive power transfer.

In another aspect the invention broadly provides an inductive power transfer apparatus suitable for producing or receiving a magnetic field for inductive power transfer on a first side thereof, the apparatus comprising:

a central solenoidal coil substantially parallel to the first side having first and second ends, adjacent turns of the central coil being spaced further apart with increasing distance from the first side, two end coils, one end coil being provided at or adjacent to each end of the central coil, the coils being operable so that when energised an arch shaped flux pattern for inductive power transfer on the first side of the apparatus is available.

In another aspect the invention broadly provides an inductive power transfer apparatus suitable for producing or receiving a magnetic field for inductive power transfer on a first side thereof, the apparatus comprising:

a central solenoidal coil substantially parallel to the first side having first and second ends, the central coil being substantially trapezoidal in a cross section through a central axis of the central coil in a plane perpendicular to the first side, two end coils, one end coil being provided at or adjacent to each end of the central coil, the coils being operable so that when energised an arch shaped flux pattern for inductive power transfer on the first side of the apparatus.

In another aspect the invention broadly provides apparatus for inductive power transfer, the apparatus comprising a plurality of adjacent power transfer modules, each module comprising at least one coil, wherein the coil(s) in a module may be energised to provide a magnetic field from that module for inductive power transfer, and wherein one or more coils in adjacent modules may be energised to provide a magnetic field extending between those modules for inductive power transfer.

In another aspect the invention broadly provides apparatus for inductive power transfer, the apparatus comprising a plurality of adjacent power transfer modules, each module comprising a plurality of coils, wherein a plurality of coils in a module may be energised to provide a magnetic field from that module for inductive power transfer, and wherein one or more coils in adjacent modules may be energised to provide a magnetic field extends between those modules for inductive power transfer.

Preferably the modules are arranged side by side.

Preferably the coils are energised dependent on the presence of a movable object adapted to receive power inductively.

In another embodiment the coils are energised dependent on a characteristic of a moveable object adapted to receive power inductively.

In one embodiment the apparatus includes a control means to selectively energise the coils. The apparatus may also include one or more power supplies.

In one embodiment the modules are provided in or adjacent to a surface over which a vehicle may travel, such as a floor or roadway.

In one embodiment one or more of the modules comprises inductive power transfer apparatus as set forth in any one of the preceding statements.

In one embodiment a permeable material may be associated with the modules to facilitate a flux path between adjacent modules when coils in adjacent modules are energised.

In another aspect the invention broadly provides a method for inductive power transfer to a movable object, the method comprising selectively energising either a plurality of coils in a module, or energising at least one coil in adjacent modules to provide a magnetic field for inductive power transfer to the movable object.

In another aspect the invention broadly provides inductive power transfer flux coupling apparatus, comprising:

a first magnetic structure having two coplanar coils adjacent the first side of the apparatus, the coils configure generate or receive a magnetic flux in a flux coupling region beyond the first side of the apparatus; and a second magnetic structure comprising two coplanar coils configured to generate a magnetic flux opposing the flux in the first coil. Preferably the first structure is located between the flux coupling region and the second structure.

In one embodiment the first and second structures are moveable relative to each other.

In a further embodiment, control means is provided to control the relative location of the first and second structures depending upon one or more parameters. In one embodiment, the parameters comprise one or more of:

magnitude of required power transfer;

efficiency of power transfer;

required magnetic field shape.

In one embodiment the coils of the first structure have a turn ratio of more than one relative to the coils in the second structure.

In one embodiment the structure is ferrite less. In one embodiment the first magnetic structure and the second magnetic structure are provided on the opposing sides of a non permeable substrate, such as a PCB, or PCB material.

In another aspect the invention provides inductive power transfer flux coupling apparatus, comprising:

a first coil of at least one turn configured to generate or receive a magnetic coupling flux in a flux coupling region; and a second coil of at least one turn configured to reflect flux emanating from the first coil.

In another aspect the invention provides inductive power transfer flux coupling apparatus, comprising:

a first coil configured to generate or receive a magnetic coupling flux in a flux coupling region;

a second coil of at least one turn configured to reflect flux emanating from the first coil; and a third coil arranged to extend the flux generated or received by the first coil.

The magnetic flux generated by the second coil may shape the field in the flux coupling region or reduce leakage flux outside the flux coupling region.

The third coil may comprise two coils, and there may be minimal mutual coupling between the two coils.

Alternatively the two coils are coupled. The two coils may be arranged in a phase relationship.

In another aspect the invention provides apparatus for extending a magnetic field for wireless power transfer, the apparatus comprising a plurality of coils tuned to resonate at or near a selected operating frequency.

The coils may be arranged in a layer, and in one embodiment there is minimal mutual coupling between the coils. Alternatively, the coils are coupled. The coils may be configured to operate in a phase relationship.

In another aspect the invention provides inductive power transfer flux coupling apparatus, comprising:

a first coil and a second coil arranged in a first layer, the first or second coils configured to generate or receive a magnetic coupling flux in a flux coupling region; and a third coil, and at least part of the third coil being arranged in a second layer, the third coil configured to generate a magnetic flux opposing the flux from the first coil or the second coil.

The magnetic flux generated by the third coil may shape the field in the flux coupling region.

In one embodiment the apparatus may include magnetically permeable material.

In another aspect the invention provides a roadway, or a vehicle, or a personal electronic device, or a charging device comprising apparatus according to any one of the preceding statements.

In another aspect the invention provides a substrate for mounting electronic components, the substrate comprising:

a first coil arranged in a first layer, the first coil configured to generate or receive a magnetic coupling flux in a flux coupling region; and a second coil of at least one turn and at least part of the second coil being arranged in a second layer, the second coil configured to generate a magnetic flux opposing the flux from the first coil.

In one embodiment the second coil has fewer turns than the first coil. The second coil may be shorted.

In another embodiment the second coil is driven separately from the first coil.

The first coil may have more than three times the ampere-turns of the second coil.

In another aspect the invention provides apparatus substantially as herein described with reference to any embodiment shown in the accompanying drawings.

In another aspect the invention broadly consists in any novel feature, or any novel combination of features, disclosed herein.

Other aspects of the invention will become apparent from the following description.

DESCRIPTION OF ONE OR MORE PREFERRED EMBODIMENTS

The inductive power transfer apparatus described below may be provided in the form of a pad, and for purposes of convenience is referred to in this document as a pad or power transfer module despite being capable of being provided in other forms. These new pads may have no ferrite in them, and in at least one embodiment there is no ferrite at all. In consequence, the construction of a pad can be very different from those presently known. The new pads can be made simply using concrete, or another suitably robust non-magnetic material such as plastic, masonry or a tough ceramic material, and a suitable conductor such as litz wire. The pads, particularly when made from concrete, are suitable for inductive power transfer in roadway applications as they are advantageously very heavy but can be constructed on-site in a simple manufacturing process.

In this disclosure new ferrite-less structures are proposed that can be non-polarised magnetic flux structures, or developed to create two or even three phase fields and associated magnetic flux paths, which still shape the magnetic flux as desired predominately on one side of the structure by suitable arrangement of current carrying coils. A first coil is used to create or receive the coupling flux i.e. the magnetic flux primarily intended for coupling with another magnetic structure for transferring power by means of a time varying magnetic field. A second coil is positioned relative to the first coil to control the flux produced from or received by the first coil. The second coil can be positioned relative to the first coil to control the field produced or received by the first coil. In particular, the second coil may be used to reduce the leakage flux from the first coil. The second coil can also be positioned relative to the first coil to the shape the coupling flux for purposes of efficiency for example, or dependent on the flux coupling structure that the apparatus is coupled with or intended to be coupled with.

Figure 1:
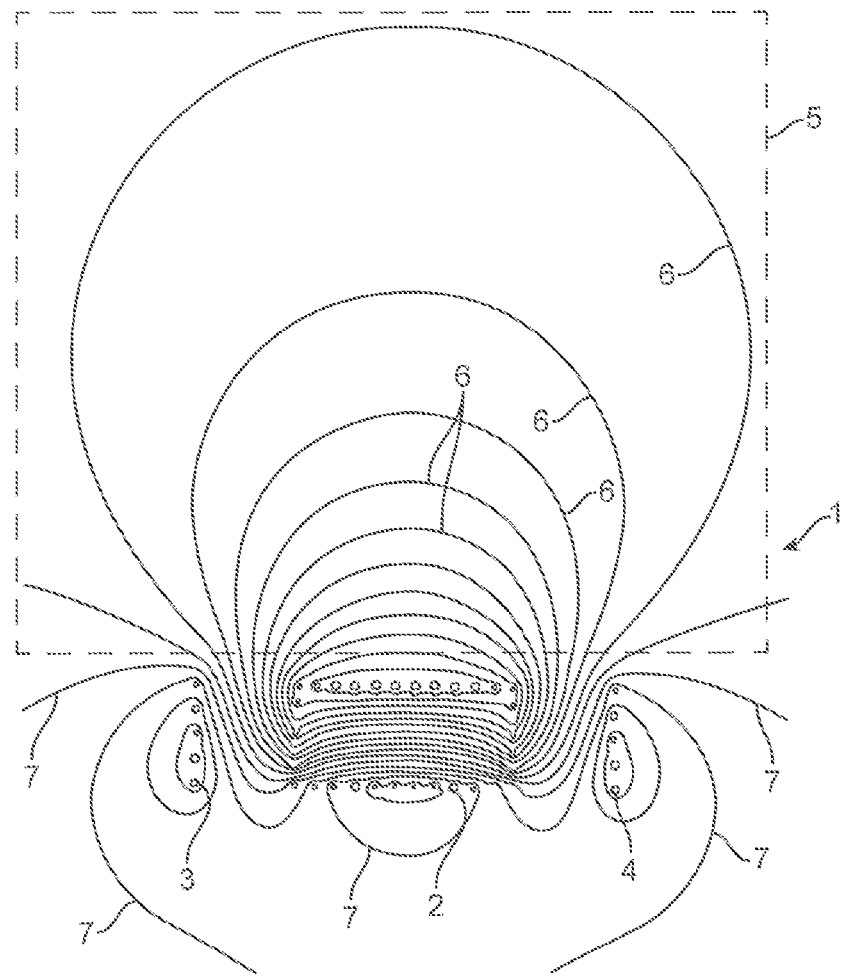
FIG. 1 is a view in cross section of a known flux coupling apparatus
Figure 2:
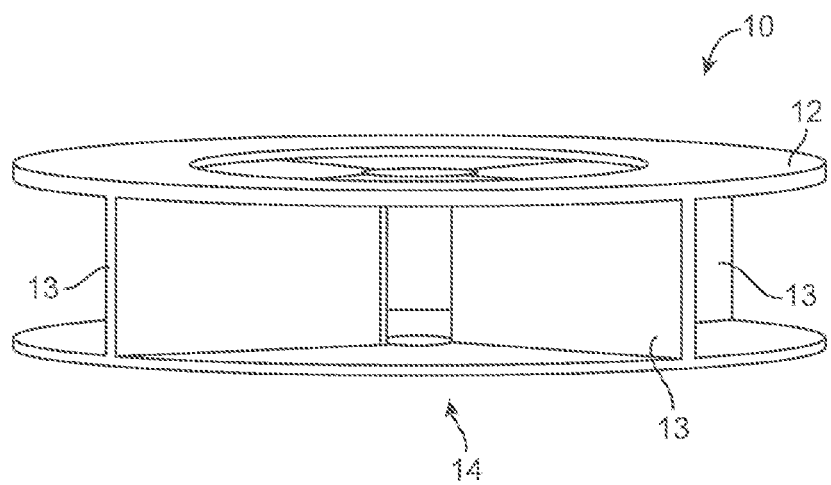
FIG. 2 is an isometric view of a new flux coupling apparatus.
Figure 3:
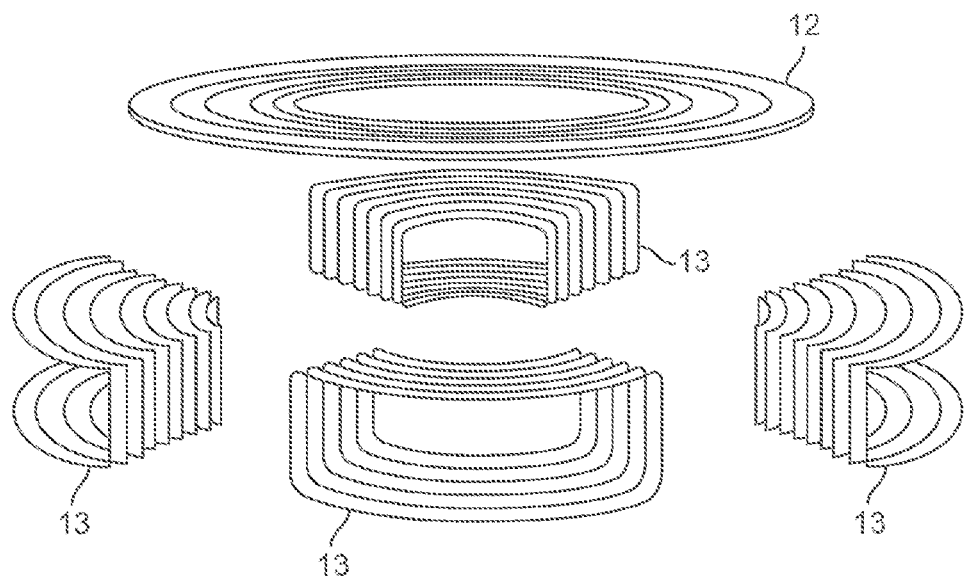
FIG. 3 is an exploded view of the apparatus of FIG. 2.

In-order to illustrate a first embodiment of a new magnetic structure, FIGS. 2 and 3 show respective assembled and exploded views of a ferrite-less pad 8 comprising on its upper side or surface 10 a first circular coil 12 with N turns. A number of wedge shaped solenoidal coils 13 are located beneath coil 12. Coils 13 are configured such that the surface of each solenoid immediately underneath the upper coil 12 has an identical number of turns N (although it may be spread to cover a wider surface area) and current I of identical magnitude and frequency flowing in phase with the upper coil 12, while the bottom surface of the solenoid carries the return current (having currents that are 180 degrees out of phase with the upper coil). Thus the regions at the upper surface of each coil 13 have 2NI ampere-turns and the regions at the lower surface of each coil 12 (i.e. the regions where the coils 13 are at lower surface 14) have −NI ampere-turns. To cover the full circular surfaces here four wedge shaped solenoids are shown, however this number could vary, for example there may be three or more in other embodiments, based on construction requirements. The solenoidal coils 13 are placed side by side such that the side planes of each solenoid which are perpendicular to the upper and lower surfaces 10 and 13 essentially touch and operate with identical but out of phase currents, so any fields created by the adjacent side walls effectively cancel.

Figure 4:
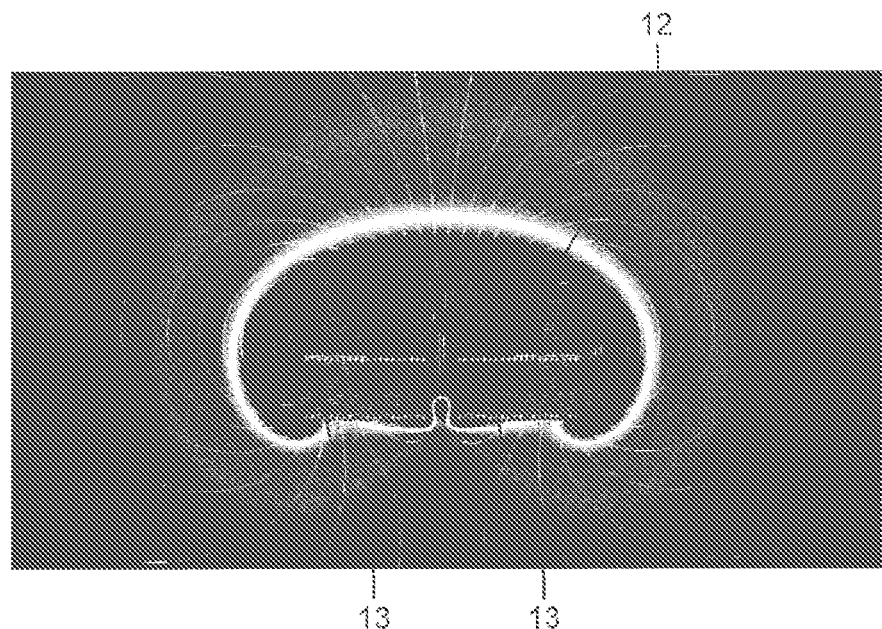
FIG. 4 is a simulated flux pattern shown in cross section in a vertical plane through the middle of the apparatus shown in FIG. 2.

FIG. 4 shows a two dimensional cross section of the flux pattern created by the assembled magnetic structure as shown in FIG. 2. Referring to FIG. 4, a non-polarised magnetic field is seen exiting the centre area of the pad at the upper surface 10 and returning at the outside. The flux pattern reveals that the majority of the flux returns through the sides of the structure, so that the field which would normally be expected to be present at the back of the pad i.e. at the lower surface 14 is substantially displaced. The generally one sided nature of the field produced is desirable since the field created by energising the structure is usefully provided in a potential flux coupling region on one side of the structure, thus reducing the unwanted leakage flux that may otherwise be present at the back or lower surface of the pad.

An improvement to the embodiment described in FIGS. 2 and 3 will now be described with reference to FIGS. 5A and 5B. In this embodiment, the wedge shaped solenoidal coils 13 of FIGS. 2 and 3 are replaced by two flat coils 15 and 16. Coils 15 and 16 replicate those parts of solenoidal coils 13 that are adjacent to the upper and lower surfaces of the embodiment shown in FIGS. 2 and 3. The side walls of the solenoidal coils 13 are thus eliminated. As the side walls generated fluxes that cancelled each other, this improved embodiment shown in FIGS. 5A and 5B has the advantage that there is a saving in the amount of conductive material required to form the structure.

The use of flat coils also has the advantage that a more robust structure can be provided, and is simpler to construct. The flat pan-cake like coils may be easily embedded in a casing suitable for a road structure but which avoids conductive materials, such as glass-reinforced concrete for example.

Figure 5A:
FIG. 5A is a side elevation of a new flux coupling apparatus.
Figure 5B:
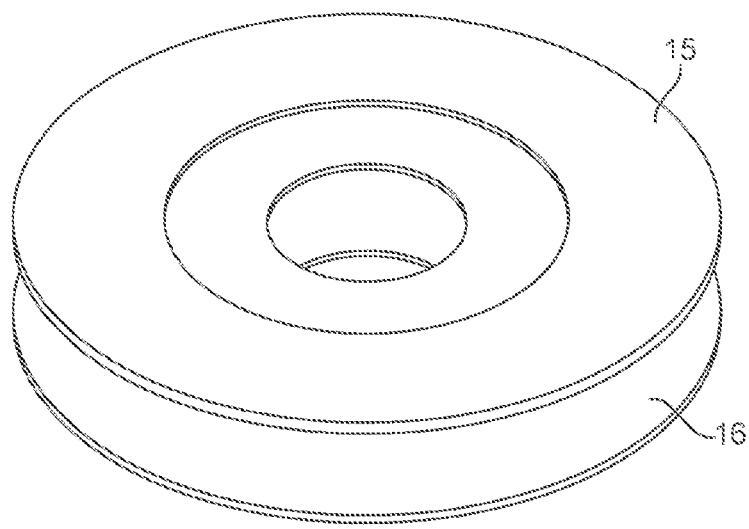
FIG. 5B is an isometric view of FIG. 5A.

Still referring to FIGS. 5A and 5B, the entire pad may be constructed so that there are three coils, each coil having N turns and energised with the same current I, however the bottom coil 16 is separated by a suitable gap and has the current flowing 180 degrees out of phase to the two upper coils 12 and 15.

Figure 5C:
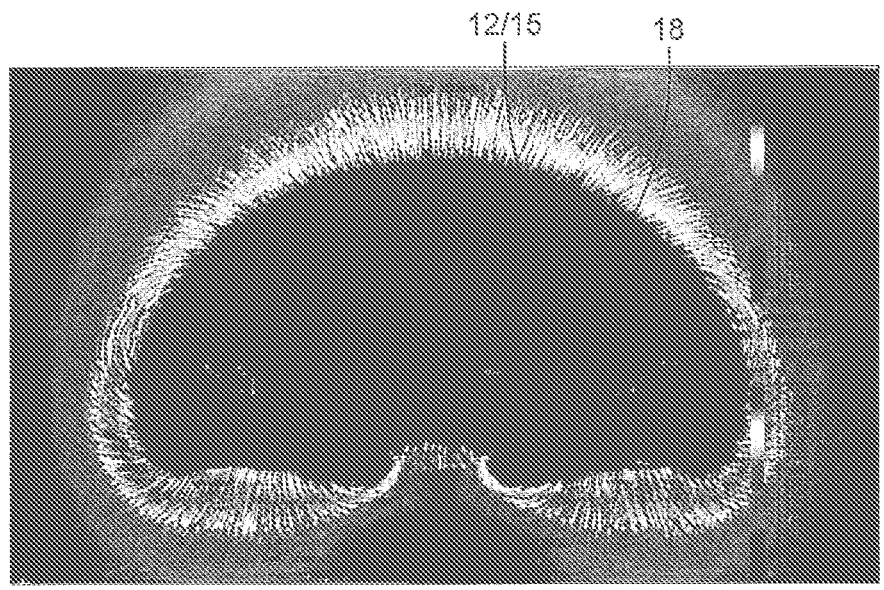
FIG. 5C is a simulated flux pattern shown in cross section in a vertical plane through the middle of the apparatus shown in FIG. 5A.

FIG. 5C shows a two dimensional flux plot of the embodiment of FIGS. 5A and 5B in operation. As can be seen in FIG. 5C, the flux from the back or lower side of the pad is suppressed while the field above the pad forms an ideal single sided non-polarised shape similar to a pad designed with circular coil on a ferrite backing. However, in this construction no ferrite exists, and the pad is suitable for applications such as burying in a road since the forces from vehicles traveling will not impact the pad construction or operation.

The two coils 12 and 15 of the pad in FIGS. 5A and 5B may be wound as a single coil 12/15 having twice the number of turns as coil 16. Moreover, all the coils 12, 15 and 16 may be wound as one complete winding giving 2NI in the upper layer and −NI in the lower layer. This is achieved by winding the lower coil in the opposite direction to the upper coil, and with half the number of turns. Alternatively the number of turns in the lower surface could be varied depending on the desired depth of the pad and the amount of flux suppression desired. The surface area of these flat coils can be made identical or have varying diameters depending on the shape of the field desired. If the coils are all wound as one complete winding then that winding can be tuned as one coil for the purposes of the wireless power supply or wireless pick-up (i.e. secondary) circuit.

Considering the structure of FIGS. 5A and 5B as three coils, if each coil has NI ampere-turns (although the bottom coil has effectively −NI), then as the lower coil 16 is brought closer to the upper coils 12 and 15 the resultant field will change. If the lower coil 16 is made to touch coil 15 then the fields from coils 15 and 16 will cancel, and the resultant field produced will be the same as that from a single circular coil (coil 12) with no flux shaping, so that the resultant field will be symmetric in all directions above and below the structure unless a ferrite or similar magnetically permeable structure is bought into proximity (such as a secondary pad in a vehicle). But this lack of control of the field shape is undesirable from the point of view of controlling the leakage flux or limiting potential field coupling into nearby metallic objects If the two upper coils 12 and 15 are operated with 0.5NI ampere-turns each and the lower coil 16 is operated with −NI ampere-turns as described earlier, then as the lower coil 16 is bought closer to the upper coil 15 the more the coupling flux above the pad is suppressed, to the point that when coils 15 and 16 are touching then operation as an efficient flux coupling device effectively ceases. As such, the level of field above the structure, and the degree of flux suppression beneath the structure, is dependent on the separation of coils 15 and 16, and the NI in each. Similarly, if coils 12 and 15 comprise a single coil, then the field above the structure, and the degree of flux suppression beneath the structure, is dependent on the separation between coil 16 and the combined coil 12/15, and the NI in each. In some embodiments it may be desirable to provide a vertically oriented solenoidal coil between the coils 15 and 16, or between coil 16 and coil 12/15.

Conceptually, if the separation between coils 12/15 and 16 is carefully chosen, the lower coil 16 could be replaced with a shorted turn (or a shorted coil comprising a plurality of turns). The use of a shorted coil is an alternative to operating coil 16 with active currents. The position of the shorted coil will naturally result in current flow opposite in phase to that of the current in coils 12 and 15, but with a current magnitude dependent on the flux coupling (which is separation dependent) to achieve a similar but less controlled result.

Figure 5D:
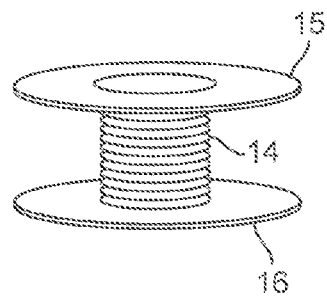
FIG. 5D is a perspective view of another new flux coupling apparatus.

Other embodiments can be created based upon a structure similar to that of FIGS. 2 and 3. For example, if coil 12 of FIG. 3 is removed and replaced with a vertical solenoid 14 (not shown in FIG. 3, but seen in FIG. 5D) located at the centre of coils 13, then removing the adjacent side walls of coils 13 (because the fluxes cancel as described above) leaves a structure as shown in FIG. 5D. If each coil has N=4 turns, then a possible winding arrangement is shown in cross section in FIG. 5E. Solenoid 14 can be eliminated while maintaining its functionality by splitting it into two, and adding the effect of each half to the flat coils 15 and 16 as shown in FIG. 5F. The result is a 3:1 turn ratio as shown in FIG. 5G.

We have found that many different ratios of ampere turns can be used between the coil of the first layer (i.e. coil 12/15) and the coil of the second layer (i.e. coil 16). In general, we have found that it is preferable that the coil of the second layer has fewer ampere turns than the coil of the first layer. As mentioned above, if the ratio of ampere turns in the first layer to the second layer is approximately 2:1 or 3:1, then the results are satisfactory. The range of ratios which seems to work best is from 1:1 to 6:1, and most preferably approximately 1.3:1 to 3:1. In general, if the coils 12/15 and 16 are moved closer together, then it is desirable to increase NI ratio i.e. increase the NI of the upper coil 12/15 relative to the lower coil 16. Thus, if the arrangement is implemented on a PCB for example the ratio may be greater than 3:1 for example 5:1 or 6:1.

Figure 5E:
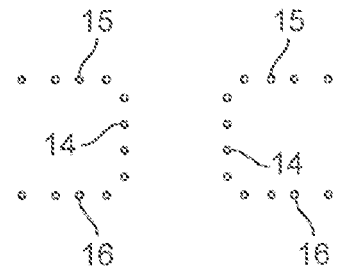
FIG. 5E is a side elevation is cross section of the apparatus of FIG. 5D.
Figure 5F:
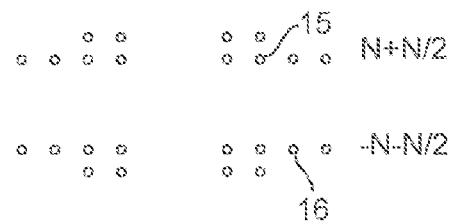
FIG. 5F is a rearrangement of FIG. 5E.
Figure 5G:
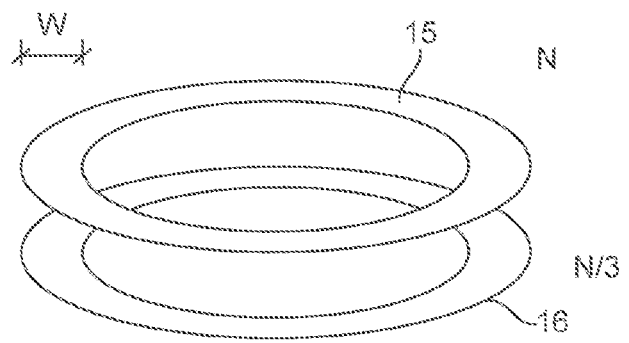
FIG. 5G is a perspective view of another new coupling apparatus

Following on from the arrangement described in FIGS. 5D to 5G, and particularly FIG. 5E, an effective separation distance between the first and second coils (i.e. coils 15 and 16) is approximately the same as the width W of the first coil i.e. the diameter of the coil less the centre opening of the coil divided by two. Effective results are achieved by keeping the width of the second coil the same or substantially the same as that of the first coil. This can be achieved by spreading the turns of the second coil further apart than those of the first coil. As described further below, the distances between the two layers can be varied depending upon the required field.

In some embodiments, the coils or layers can be provided so that the distance between them is adjustable. In one embodiment for example a coil separation device or movement device is provided which will bring the coils closer together or further apart depending upon the required field. In one embodiment the field may be sensed using sensors, and in another embodiment there may be information feedback from a secondary device relating to the field produced by the apparatus. Based on the feedback from the sensors or the secondary device, the coils may be moved further together or further apart until a required field characteristic is achieved.

In another embodiment the device which is operable to move the coils relative to each other is operable to alternatively, or additionally, change the alignment of the coils structures in the first and second layers to thereby redirect the field or to control leakage or back flux. Again, a secondary device or plurality of secondary devices, or other sensors, may be used to provide an indication of the field which is being produced or received, and based on that information the relative coil separation and/or alignment can be varied by the device until the required result is achieved. This process is shown for example in FIG. 6 in which upper layer coil 12/15 and lower layer coil 16 are moveable relative to each other in one or both of separation and alignment by device 17 which receives information from a sensor or secondary device 18. Device 17 may comprise a controller for receiving and processing information, and one or more actuators operable to move the coils relative to each other. The actuators may be electric, mechanical, pneumatic or hydraulic for example.

In another embodiment, the upper layer coils may comprise other shapes such as oval or rectangular shapes, and device 17 may be operable to change the relative angular position of the coils to thereby influence the nature of field which is produced or received by the structure. For example, device 17 may be operable to move two aligned rectangular coils angularly relative to each other about a common axis which passes through the centre of each coil. In other embodiments, apparatus 17 may be operable to move one or more of relative angular position, alignment and separation of the coils. The angular separation may include angular adjustment around axes other than an axis which is perpendicular to the general plane of the layers in which the coils are provided.

Another feature of the arrangement described with reference to FIGS. 5D to 5G is that the voltage across the N/3 coil 16 (FIG. 5G) is the current times the inductive reactance of the N/3 coil plus the mutual inductive reactance of the N coil 15 times the current. As the coils are wound in opposite directions the voltage across the N/3 coil can at least be made to be substantially zero.

Regarding winding arrangements, in the embodiment of FIG. 5 for example there may be 18 turns above and 6 turns below all carrying the same current however the 6 turns will have the current reversed in direction.

To make it simple to connect we would series wind these two coils so that there is only one terminal connection at the pad and no breaks in the winding (minimising the terminations).

And as an example to manage the voltage across the winding we may well choose to wind half the top layer first (9 turns) followed by the 6 turns of the bottom winding and then finishing with the final 9 turns of top winding all in series.

Figure 6:
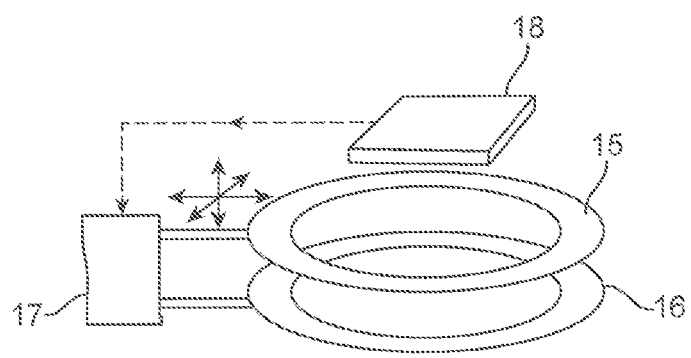
FIG. 6 is a diagrammatic perspective view of the apparatus of FIG. 5G with a coil positioning apparatus.
Figure 7A:
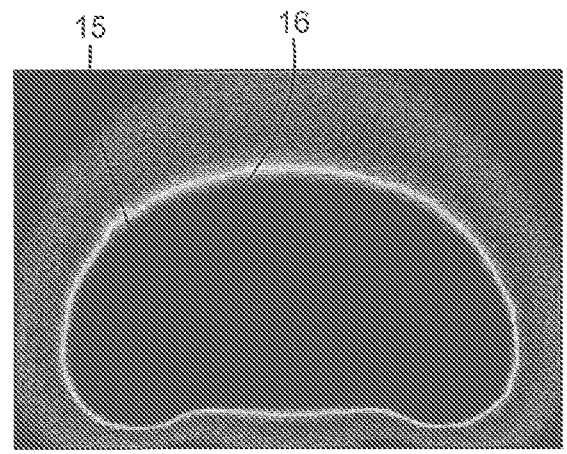
FIGS. 7A and 7B are simulated flux pattern shown in cross section in a vertical plane through the middle of the apparatus shown in FIG. 5G but with different ampere turns.
Figure 7B:
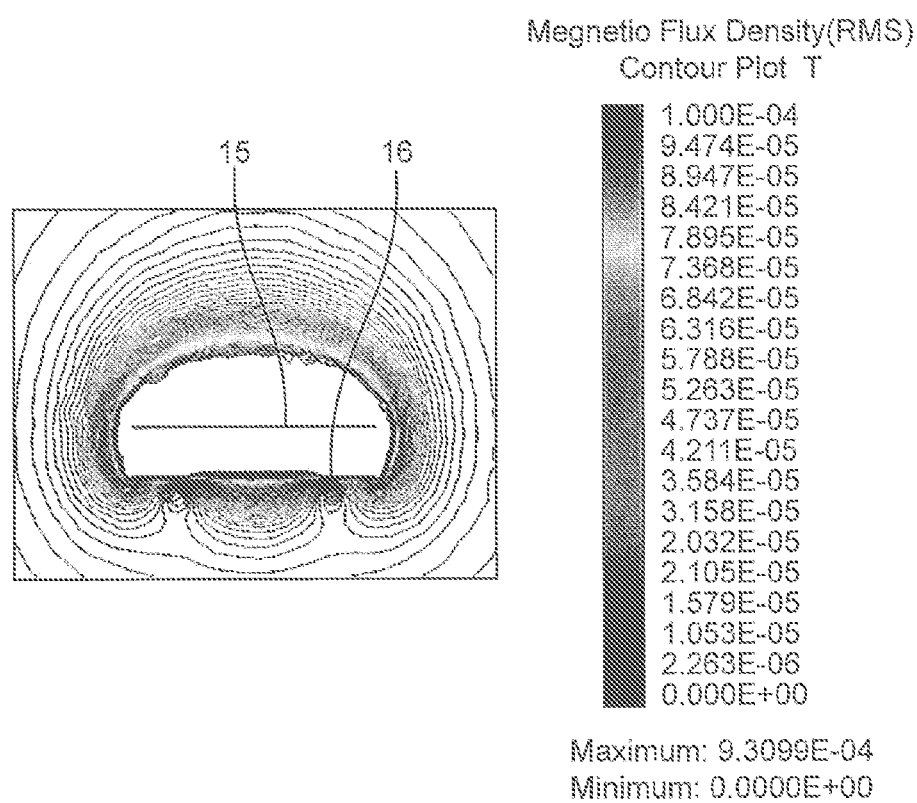

Referring now to FIGS. 7A and 7B, a comparison can be made between two identical coils which have ampere turns ratios of 2:1 and 3:1. FIG. 7A shows a flux plot from a vertical cross section through two identical coils such as those shown in FIG. 6, and FIG. 7B shows a flux plot for the same coils that the same separation distance, but with the ratio of ampere turns of 3:1 for the upper coil relative to the lower coil.

Figure 7C:
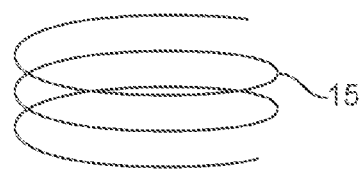
FIGS. 7C and 7D are diagrams of further forms or flux coupling apparatus.
Figure 7C:

This concept can be applied to other coil shapes or types to provide an ideally single sided flux coupling structure. For example FIG. 7C shows a solenoidal coil 12/15 spaced substantially axially apart from another solenoidal 16. Coil 12/15 has a greater NI than coil 16, and coil 16 has current flowing in the opposite direction to that of coil 12/15. In this arrangement the field is suppressed beneath coil 16, as described in the embodiments referred to above. Coil 16 may also be seen as a magnetic reflector since it functions as a coil which reflects the field that would otherwise extend from the lower side of winding 12/15. That field is reflected upwardly to provide the desired field shape.

Figure 7D:
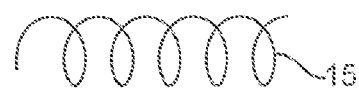
Figure 7D:

In FIG. 7D the principle applies again even though the solenoidal coils have their longitudinal axes arranged horizontally rather than vertically. The field present beneath lower coil 16 will still be reduced to produce a substantially single sided flux arrangement in which the field is substantially present above upper solenoidal coil 12/15. However the field present at the sides of the arrangement will be greater than that for the embodiments of FIGS. 5A to 5G.

It will be seen that combinations of different coils (e.g. one or more substantially annular or annular flat coils and one or more solenoidal coils) may be used to provide a required field in accordance with the principles discussed herein.

Although the embodiments above show the first coil 12/15 and second coil 16 arranged in substantially parallel planes, it will be appreciated that other arrangements are possible. For example, the first coil 12/15 can be provided as a first layer of a magnetic flux coupling structure, and coil 16 may be provided as a second layer of that structure. Such layers may take a variety of forms, for example they could curve or undulate. In the embodiments above, coils 12/15 and 16 are shown substantially co-axially aligned, but as described elsewhere in this document the relative coil dimensions and alignment may vary depending upon the flux pattern that is required to be achieved in use. The coil 16 may be arranged in a layer that is not necessarily planar and does not necessarily replicate the contour of the layer in which the coil(s) 12/15 is provided. Although circular coils are shown in FIGS. 5A 5B and 5G, other coil annular shapes may be used in other embodiments, for example oval, rectangular, square or irregular shapes. Moreover, the coils 12/15 and 16 can be different annular shapes.

In practice the results have shown that the reflection coil 16 slightly decreases the coupling to the secondary pad but suppresses the leakage behind the back face of the primary pad 12/15 and also outside the charging area between the primary and secondary pads. In its most basic form the technology is for a main coil in the shape of an annulus with a coaxial reflection coil, also an annulus, underneath it. One or both coils can be spiral wound, and in one embodiment one or both coils can be spiral wound without a central aperture.

The parameters of the coils 12/15 and 16 are the outer diameter (OD), the inner diameter (ID), and the number of turns. For a majority of applications the differences between the OD's and the ID's is typically 10% to 30% of the average diameter and the turns ratio between the main coil and the reflection coil is typically 3:1. Commonly the diameters are quite similar and the spacing between the coils is close to the average diameter. As the spacing between the coils is decreased the interaction between the fields is much stronger and less flux is thrown upwards. In doing so the turns-ratio must be increased or the size must be readjusted to keep a high coupling flux. Thus for spacings between 100-200 mm between the main coil and reflection coil a turns ration of 3:1 is preferred for most sizes. Finer control can be achieved by having different currents flowing in both coils to achieve an exact NI ratio but for practicality changing the turns ratio is preferred as it is convenient to use the same wire to wind both coils without a break.

As long as the distance between each turn is not greater than 4-5 wire diameters, the coil width can be perhaps 20%-30% of the coil diameter and multi-filar coils may be used to get higher Q values.

Figure 7E:
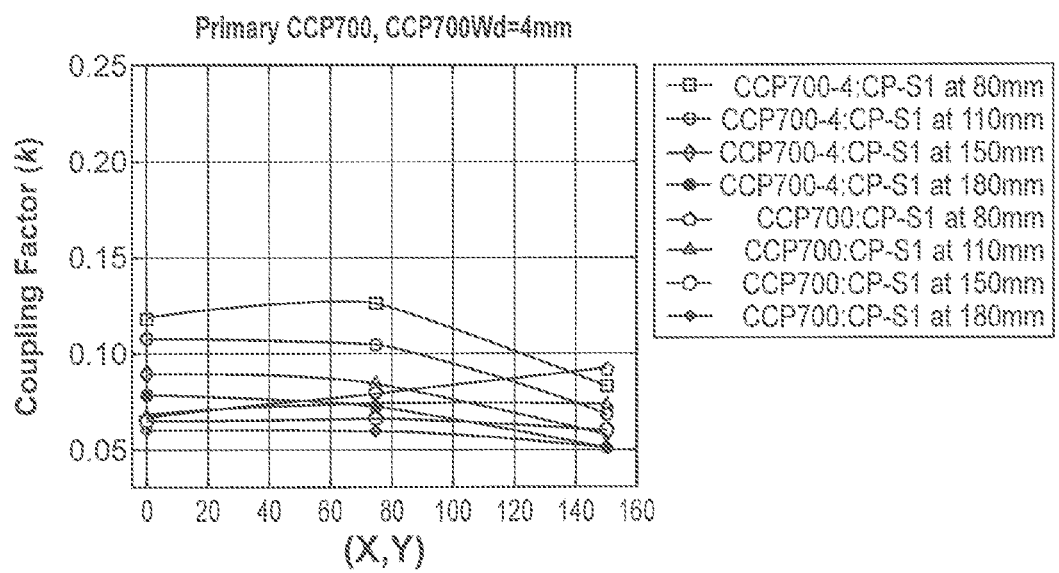
FIGS. 7E and 7F are plots of coupling factor against displacement for a primary circular ferrite-less coupler of 700 mm diameter coupling power to two secondary square shaped coils with ferrite backing having nominal diameters of 280 mm (labelled as S1) and 350 mm diameter (labelled as S2), at various separations when centred and misaligned at height separations from 80 mm to 180 mm
Figure 7F:
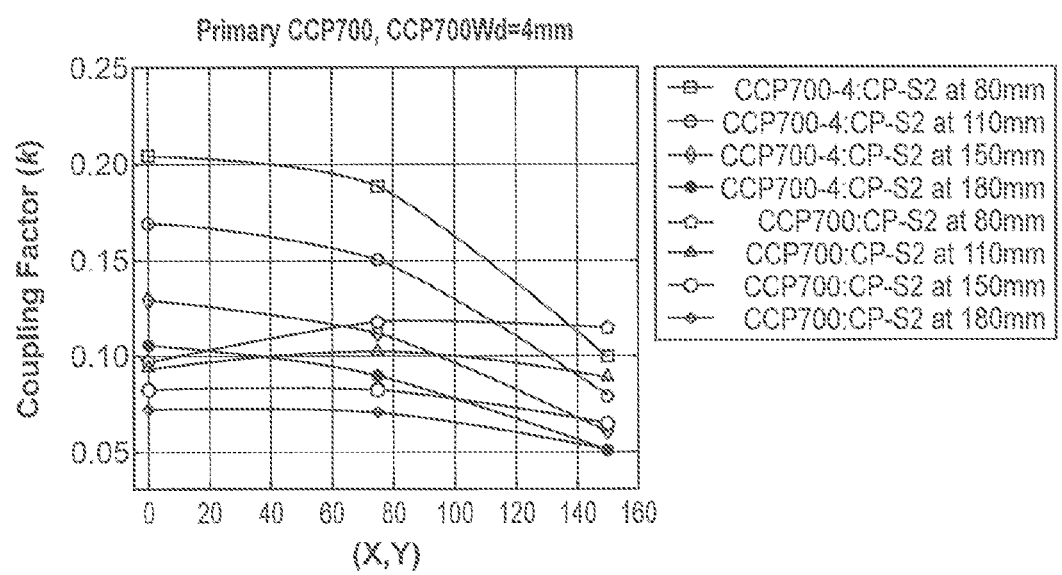

Changing the coil width and spacing of the coils allows the leakage flux to be controlled and improving the power to leakage flux ratio is an excellent figure of merit to get a better coil. Referring to FIGS. 7E and 7F for example when a primary circular ferrite-less coupler was used with 700 mm diameter to couple power to two secondary square shaped coils with ferrite backing having nominal diameters of 280 mm (labelled as S1) and 350 mm diameter (labelled as S2), at various separations when centered and misaligned at height separations from 80 mm to 180 mm the coupling was increased by a further 50 to 100% in the working area of the pads (up to 100 mm spacing offset) when the wires in the primary coil (originally spanning 46 mm by having the wires in each turn touching) were separated by 4 mm (making the coil width span 68 mm) as shown in FIGS. 7E and 7F. This spreading of the primary wires forces the pole in the centre of the coupler to be closer together rather than spread around and near the inner circumference of the winding. In consequence it causes more flux lines to intersect with a smaller secondary as is commonly used in practice, and raises the system coupling.

In another embodiment, a similar pad construction can now be achieved using a bipolar coil structure, an example of which is shown and described with reference to FIG. 8. By way of background, bipolar flux coupling structures have mutually magnetically decoupled coils which enable the structure to be selectively operated in a polarised or non-polarised fashion. Further information is available in published international patent applications WO2011/016737 and WO2012/018269.

Figure 8:
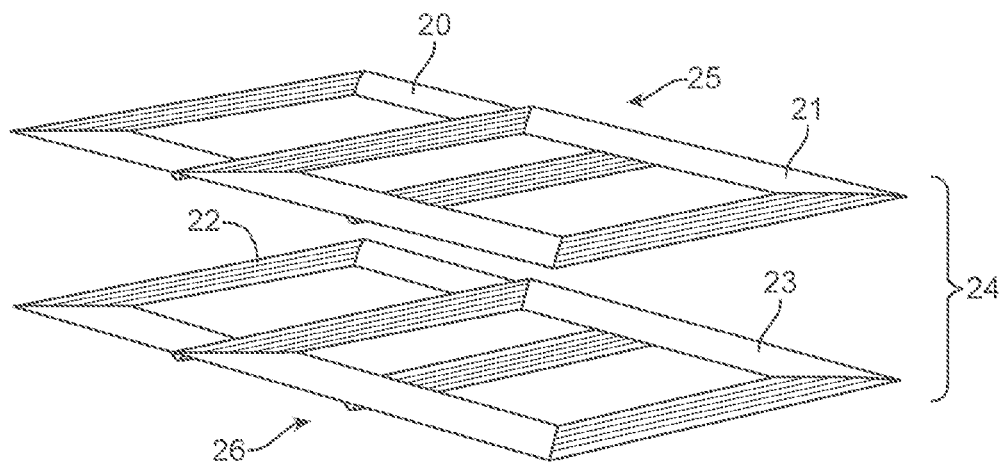
FIG. 8 is a diagrammatic perspective illustration showing a bipolar pad having a second magnetic structure below it.

Referring to FIG. 8, a pad structure 24 has an upper layer comprising two coils 20 and 21 which are positioned relative to each other so that the magnetic coupling between them is substantially minimised. Ideally the mutual coupling is zero, but in practice a small amount of coupling may be present due to factors such as component tolerances. We have found that reducing mutual coupling below substantially 5% during operation is desirable. Mutual coupling less than substantially 1% is desirable without the secondary present. These ranges are usually sufficient to enable independent operation of the coils while still making a field available at a sufficient distance from the pad for adequate power transfer to a secondary structure.

By minimising mutual coupling the coils can be energised substantially independently, and thus one or both coils may be operated in a unipolar fashion, or both coils may be operated in a complementary manner (for example being energised by alternating currents but with a 180 degree phase difference between the coils) to establish a field extending from the pole formed by one coil to the other. In one embodiment, to achieve minimal or near minimal coupling, the coils 20 and 21 are substantially co-planar and overlapped as shown in FIG. 8. In other embodiments the coils 20 and 21 may be arranged in the same general layer. Such a layer may take a variety of forms, for example it could curve or undulate. The degree to which the coils overlap may vary depending on the coil shape. Although rectangular coils are shown in FIG. 8, other coil shapes may be used in other embodiments, for example oval, circular, square or irregular shapes.

Still referring to FIG. 8, coils 22 and 23 are located below coils 20 and 21 respectively. Following on from the disclosure above, the coils 22 and 23 may be used to control the field produced by coils 20 and 21. Thus coils 22 and 23 may be used to control the field produced by the pad structure comprising the four coils 20-23 i.e. to shape the field in the flux coupling region 25 above the structure and/or reduce the field that would other wise be present behind or below the structure in region 26. In this embodiment, coils 22 and 23 are co-axially aligned relative to coils 20 and 21, but as described elsewhere in this document the relative coil dimensions and alignment may vary depending upon the flux pattern that is required to be achieved in use. Again, the coils 22 and 23 may be arranged in a layer that is not necessarily planar and does not necessarily replicate the contour of the layer in which the coils 10 and 21 are provided. However, in this particular embodiment coils 22 and 23 should also be arranged to be substantially mutually decoupled as with coils 20 and 21 in the first or upper layer.

The upper coils 20 and 21 shown in FIG. 8 can be wound with 2N or 3N windings for example and the lower coils 22 and 23 can be wound with N windings, although other options may be used based on the desired flux pattern. However the following description for the FIG. 6 embodiment will assume a ratio of 2N:N between the coils 20 and 21 of the first layer and the coils 22 and 23 of the second layer.

Although the coils within each layer i.e. coil 20 and 21 (the first layer) and coil 22 and 23 (the second layer) are substantially mutually decoupled it should be noted that the coils between layers are not decoupled. In accordance with the disclosure above, in one embodiment coil 22 will be driven out of phase (180 degrees) from coil 20, and coil 23 will be driven out of phase (180 degrees) from coil 21. In practice this can be achieved by simply connecting coils 20 and 22 as one winding but wound in opposite directions (and also winding and connecting coils 21 and 23 in this same manner). As such, if coil 20 or 21 is activated to produce a north pole at its centre then coil 22 or 23 has currents flowing to produce a south pole which however is weaker because coils 22 and 23 have fewer turns. In another embodiment, coils 22 and 23 could simply have shorted turns, so that the flux coupling from the operation of coils 20 and 21 causes currents to flow in each of these coils that is out of phase and would achieve a similar but less controlled result.

In operation, decoupled coils 20 and 21 are individually tuned and driven from two resonant inverters having synchronised currents, so that these coils can be operated in a controlled and desired manner completely independent of each other to create any field shaping desired. In this way they could be made to operate with different current magnitudes, different phases, or even at different tuned frequencies. Because of the connections (either physical or by coupling) of coils 22 and 23 to the upper coils 20 and 21, coils 22 and 23 will operate to support this field creation and suppress back flux from the pad.

Significantly, the decoupled nature of the coils within each layer allows coil 20 or 21 (and thus coil 22 or 23) to be shut down while the other coil is operated. This has efficiency benefits in situations where only one coil is required to be operable. For example, if a suitable secondary structure is located in a position where it is efficiently powered by one of coils 20 and 21 but not by the other, then the other coil can be shut down, and there will be no induced current in the other coil, which further improves efficiency.

One mode of operation is to simply operate all coils at the same tuned frequency but either in or out of phase. When operated in phase, the coils 20 and 21 (each with 2N turns) should be activated with 2NI and the lower two coils 22 and 23 (each having N turns) also operate in phase with each other but produce −NI because the direction of current in these coils is opposite to the upper coils. The result is to produce a non-polarised field similar to that described above with reference to FIG. 5C.

If the decoupled coils 20 and 21 are made to operate out of phase at 180 degrees (and similarly 22 and 23) then a north-south pole can be created and the field is polarised in the elongate direction of the pad. In this example all pad layers should be operated in similar fashion so that 2 NI is created in the top layer and −NI in the lower layer, but it will be seen that other arrangements may be used dependent on the required field shape or flux pattern.

For circular mode couplers or multi-coil couplers such as the bipolar operating in circular mode, the difference in coupling between a well-designed ferrite-less coupler with refection coil and a circular couple with ferrite backing of similar pad area may be around 20%, however the amount of power able to be delivered to the secondary for a given leakage outside the charging area where humans may be present is generally similar or better in the case of the ferrite-less coupler (with variations depending on position of the secondary relative to the primary). The consequence of this lower coupling is that the primary coil must be driven harder to transfer the power and the higher Volt-Amps across the coil naturally results in higher losses for given power transfer depending on the quality of the pad constructed. Built pads in the lab were found to have quality factors typically ⅔rd of a pad with similar area which contains ferrite. In consequence the additional systems losses when coupling into an identical ferrite secondary may only be 1-2% higher for a given power transfer (with variations dependent on the position of the secondary relative to the primary). Notably the coupling factor and quality factor of the primary ferrite-less pad can be improved if the ferrite-less pad area is made slightly larger which adds only slightly to the copper usage given there is no ferrite present.

For polarised ferrite-less couplers such as the Double D coil structure or the bipolar pad (both of which are described further below) operating in a mode to produce flux patterns similar to the Double D coil structure, the coupling to a known secondary has been found to be lower than circular topologies. The difference in coupling between ferrite and ferrite-less designs of similar area is typically 50-65% based on design. This lower coupling arises because the path length for the flux under the spread coils in the centre of the Double D mode can be long however since these fields flow through ferrite this creates a flux pipe with very low reluctance which allows the north and south pole to be separated without significantly weakening the field strength. Consequently in a Double D primary with ferrite, high arching fluxes can be created above the primary without significantly weakening the field strength by this means. In contrast when the north and south poles are separated by spreading the wires in the centre of a ferrite-less pad the reluctance under the spread wires is that of air, so that as the path lengths are lengthened, creating similar field shapes to the ferrite Double D structure, the field strengths that are produced are much lower. This results in lower coupling to the secondary. Despite this lower coupling, in operation, the ferrite-less Double D was found to generate less leakage in the regions where humans may be present compared with a conventional ferrite based pad of similar area under normal operating conditions (for a given power transferred to the secondary). However due to the lower coupling and quality factor of the pad, additional system losses of around 2-5% were noted based on expected operational misalignments.

Thus in both circular and polarised pad designs the ferrite-less structures discussed were found to be able to transfer the needed power with similar or less leakage with small additional system losses when a pad of similar surface area is used, but the pad itself is naturally robust.

To overcome the weakened field strength of the ferrite-less Double D or bipolar in Double D mode, a hybrid pad structure can be created which uses the ferrite-less design to shape the field but uses a small amount of ferrite to achieve the desired flux pipe under the area where the wires are spread in the centre of the pad. The volume of introduced ferrite in this hybrid structure is expected to be significantly smaller than a traditional ferrite Double D pad and small enough to be protected from forces expected in roadway applications or similar. In design ensuring the ferrite which is introduced is encapsulated so that it does not break is ideal and is also sufficient in volume that it does not saturate in operation. Alternatives to ferrite bars may be powdered ferrite or iron-sand in vacuum and protected in a cover, that despite their lower relative permeability, would ensure an improvement in field strength and coupling to the secondary over the original ferrite-less pad. Other alternatives for this hybrid pad structure include using finemet or other amorphous material which are naturally non-brittle to help create the desired "flux pipe" and these materials naturally address the robustness of the primary pad.

In practice while primary pads have been discussed, these designs could be used in the secondary, where the primary is a traditional ferrite pad in applications where this is desirable.

The reflection coil in a ferrite-less pad design while generally shown as having an identical structure with but fewer turns to the main driving coil, can also be modified in shape by spreading the winding or winding its diameter relative to the main coil in order to achieve improvements in the level of flux leakage generated outside the power transfer region where humans maybe present. Simulated results have shown that for a given power transfer to the secondary, increasing the diameter of the reflection coil by as much as 50% can reduce the leakage although it also tends to negatively impact the coupling of the primary and secondary. However the power able to be transferred to the secondary, for a given level of flux leakage at a point where humans are present, can be higher. This means that more power can be transferred before the limits enforced by standards are reached. Thus adjusting the diameter of the reflection coil to be a different size relative to the main coil is an important design parameter and can be optimised based on expected operation.

Figure 33:
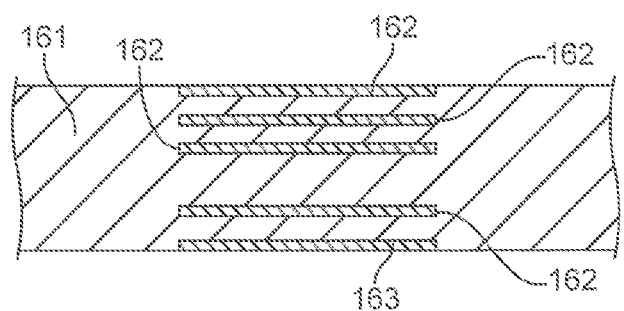
FIG. 33 shows a cross section through a PCB having a coil arrangement according to another embodiment of the invention.

Naturally, if three or four phase decoupled coil structures are desired, a similar multi-layer coil pad can be applied with multi-driving functions as shown for example in FIG. 33.

The examples discussed herein refer mainly to powering vehicles and the use of roadway systems. However it will be understood that many other applications are possible.

Creating a wireless charging pathway or strip is desirable for slow moving or even stationary vehicle charging application such as taxi ranks, and for dynamic applications such as roadway charging. This is seen in a further embodiment which is described below by way of example with reference to FIG. 9. In that Figure, two bipolar ferriteless pads 24 as described with reference to FIG. 8 are placed side by side, for example along a path or roadway over which a vehicle may travel. For ease of description, one pad is referenced 24A and the adjacent pad is referenced 24B. The adjacent pads 24A and 24B which sit in close proximity to each other are not decoupled. However, in operation, a pad 24 is only energised for power transfer when a secondary pad on a vehicle (for example) is in a position to receive power, for example being positioned immediately above pad 24A. Thus, when the pad 24A is energised, the flux generated preferentially couples with the secondary pad on the vehicle rather than the adjacent pad 24B.

Modes of operation can be described further with reference to FIGS. 10A-10E. In those figures pads 24 are provided in or on a roadway 28 being any structure that supports a vehicle 30 having a secondary pad or flux coupling structure 25 capable of coupling with one or more pads 24 to receive power therefrom.

Figure 10A:
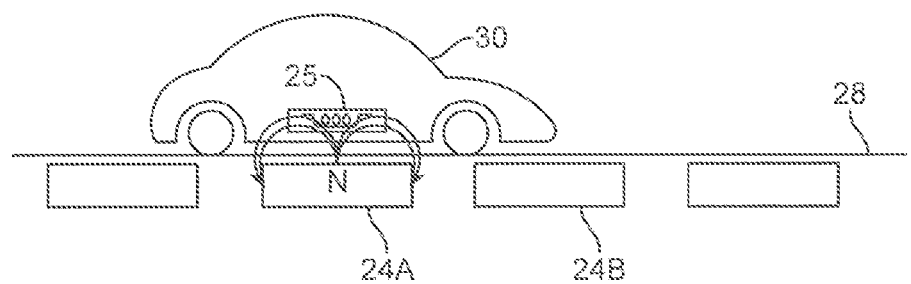
FIG. 10A shows a vehicle having a non-polarised secondary pick up pad provided over a non-polarised primary pad.

Referring to FIG. 10A, if secondary pad 25 comprises a non-polarised structure and is positioned above pad 24A for example, then pad 24A can be energised with its coils in phase. Coils 20 and 21 of pad 24A will have in-phase currents, and coils 22 and 23 will have currents in phase with each other but 180 degrees out of phase with respect to coils 20 and 21. This is shown in FIG. 10A where the centre of the pad 24A may at some instant in time have a north pole, while the outside resembles a south pole.

Figure 10B:
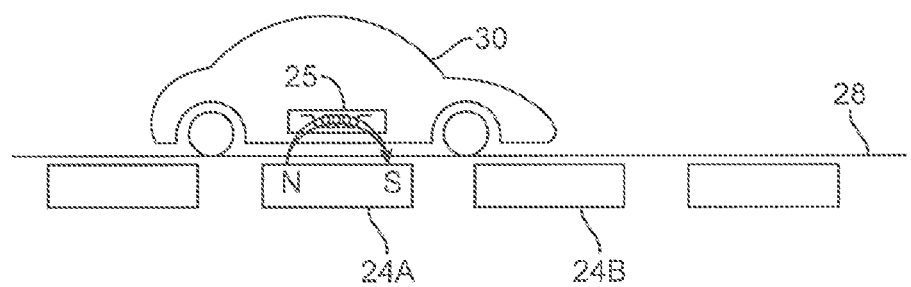
FIG. 10B shows a vehicle with a secondary which is capable of receiving or coupling with a field generated bipolarised primary pad.

Another mode of operation is shown in FIG. 10B. In this example, secondary pad 25 comprises a polarised structure i.e. a structure adapted to have a pole area at one end of the structure and an opposing pole area at the other end of the structure. One example of a polarised structure is a solenoid arranged longitudinally parallel to the longitudinal axis of pads 24. Another example of a polarised pad structure is the Double D pad design referred to earlier in this document and published in WO 2010/090539 aligned longitudinally parallel to the longitudinal axis of pads 24. In order to transfer power to the polarised secondary 25, coil 20 and coil 21 of pad 24A are operated 180 degrees out of phase, so that flux arches from the N pole established by energisation of coil 20 to the first pole of the polarised secondary 25, into the secondary, and out the second pole of the secondary 25 back to the S pole formed by energisation of coil 21. Coils 22 and 23 will have currents 180 degrees out of phase with each other and 180 degrees out of phase with respect to coils 20 and 21.

Figure 10C:
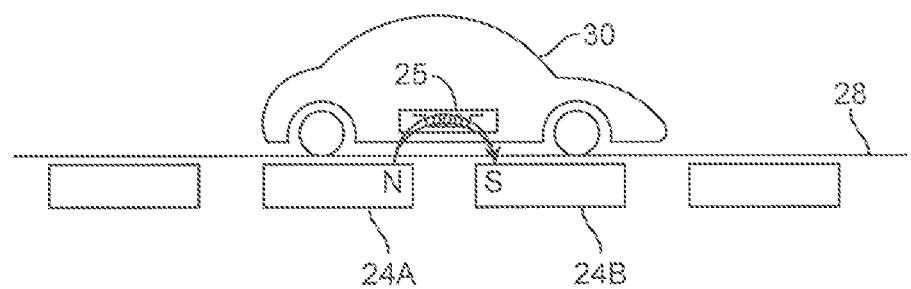
FIG. 10C shows a vehicle spanning two primary pads, the vehicle having a secondary capable of coupling with polarised fields.

Another mode of operation will now be described with reference to FIG. 10C. In this example secondary 25 is again a polarised structure. If in a taxi rank for example vehicle 30 is parked, or moving, between pads 24A and 24B then the two outer coils of the bipolar pads can be made to operate to form opposite poles. Thus coil 21 of pad 24A and coil 20 of pad 24B are energised out of phase. Coils 23 and 22 of the respective pads operate out of phase with each other, and out of phase with coils 21 and 20 respectively. The remaining coils of the pads 24A and 24B are not energised in this mode of operation so that the field is localised under the vehicle as required.

Figure 10D:
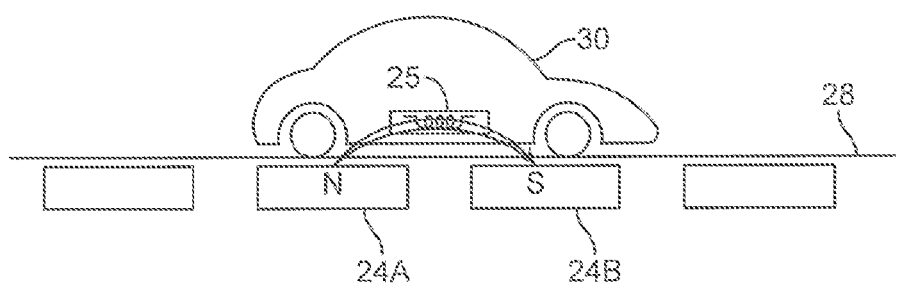
FIG. 10D shows a construction similar to FIG. 10C, but with the poles of the primary pads being spread further apart, the field being generated by two unipolar primary pads.
Figure 10E:
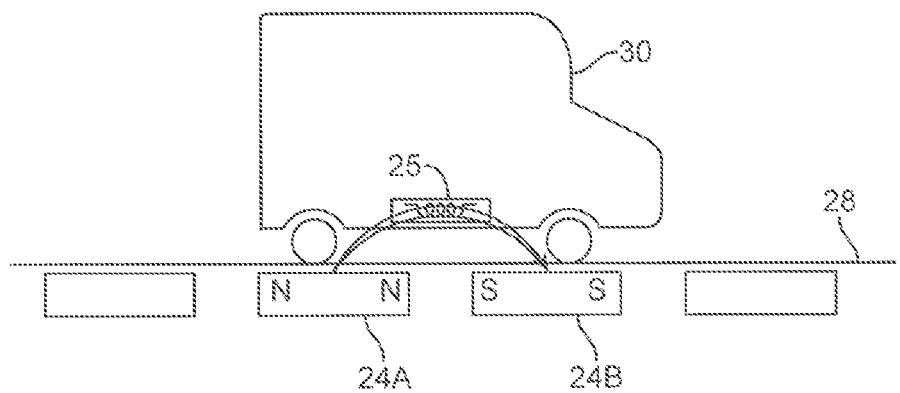
FIG. 10E shows two bipolar pads in the roadway being energised to each produce a different pole.

FIGS. 10D and 10E show a mode of operation which can be useful for transferring power to secondary structures that are a greater distance away from the primary pads 24. In the example illustrated, the secondary 25 a polarised structure and is provided on a vehicle 30 with an above average ground clearance, such as an SUV or truck. Although reference numerals 24A and 24B are used to refer to the pad structures in those figures, other structures may be used. In FIG. 10D a non polarised pad such as that of FIG. 11 may be used.

In FIG. 10E the vehicle is moving between two pads 24A and 24B. In this mode each pad can be made to operate with their decoupled in phase companion. Therefore, coils 20 and 21 of pad 24A are operated in phase and coils 20 and 21 of pad 24B are operated in phase. However, the coils in pad 24A are out of phase with the coils in pad 24B. This creates a larger ferrite-less pad with greater separation of the poles and therefore a higher arching flux field to enable coupling to vehicles with greater ground separation, or coupling to vehicles which have larger secondary structures 25 with equally larger pole separation (for example where higher power transfer may be desired). In one embodiment the coils 22 and 23 of the second layer are not required but are instead replaced with a material such as ferrite to allow a flux path between adjacent pads.

For dynamic roadway applications this concept can be taken further, and the roadway can be considered to be built up from individual sections comprising flat coils positioned in the ground and one or more pads may be activated as required based on the position of a vehicle while it is driving above a series of pads (as in FIG. 10). These roadway sections can be considered to be built using simple coil structures as in FIG. 11 below or the more complex coil structures described above in FIGS. 8 and 9.

Figure 11:
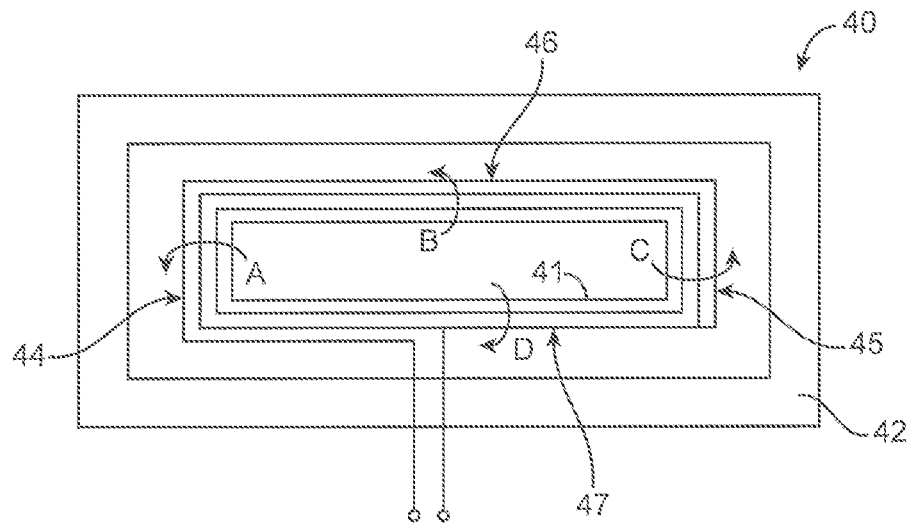
FIG. 11 shows a diagrammatical illustration of a flat primary winding and a cancellation coil.

For the simple pad structure 40 shown in FIG. 11, the coil 41 that is intended to produce or receive coupling flux is wound on an essentially flat surface of a material 42 which is a non-metallic non-magnetic material. In practice material 42 could be a strong tough ceramic surface—plastic would not be suitable as it would lack the strength required. The coil 40 has a relatively small number of turns, for example 8-11 turns, and the distance between adjacent wires is larger on the ends 44 and 45, than on the sides 46 and 47. A flux cancellation coil 50 is also provided which acts to cancel or suppress flux in use. To simplify description of the operation of pad 40, the effect of flux cancellation coil 50 is ignored for the purposes of explaining the operation of the pad in FIG. 11 and or the pair of structures in FIG. 12, but its operation and effect are described further below with reference to FIGS. 13 and 14.

Referring to FIG. 11, when the coil 40 is excited there are four separate flux patterns produced. There is no ferrite and no metal in proximity so the flux lines are not distorted. Here the windings are described in new terms. There is a circular magnetic flux (B field) produced around each of the ends 44, 45, and the sides 46, 47. These fluxes are referenced A, B, C, and D. Because of the circular nature of these fluxes they are called here flux whorls—similar to whorls on human finger-prints. These four fluxes define a north or a south pole depending on the polarity of the excitation current, but as shown here there is no flux out of the pole face as there is no magnetic path for it and all of the flux is in these four flux whorls.

If a secondary structure is brought into alignment but vertically above coil 41, then this pattern of flux whorls will couple voltages into the secondary, and the power transfer will be dependent on the extent of alignment and the separation distance.

Figure 12:
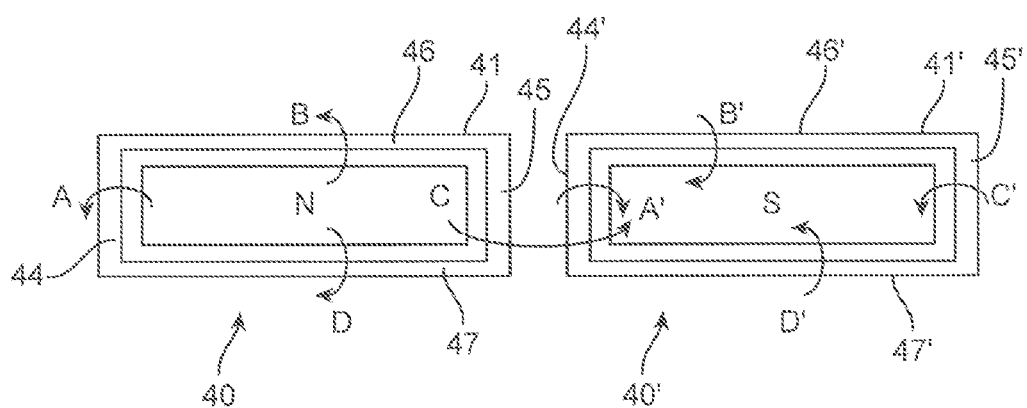
FIG. 12 shows the arrangement of FIG. 11 repeated to provide two coils on a side by side relationship.

When another pad 40' is closely associated with this pad, end to end, as shown in FIG. 12, the two pads can partially merge, and the flux whorl C that was around end 45 expands to merge with a flux whorl A' around 44' producing a larger flux whorl combining C and A'. It will be seen that the second pad 40' has the opposing polarity north—south. The combined flux whorl C and A' can now couple power to pad 40'. All four of the flux whorls A-D can couple power to another coil in close proximity in this manner, and as other coils are added end to end the capability of the system to couple power from the path (such as a roadway) along which coils 40, 40' are provided to a secondary structure such as a coil under a vehicle is expanded.

In a practical roadway application the coils 40 and 40' are repeated along the roadway in a sequence as in FIG. 10 for any required distance, so the sequence simply repeats 40, 40', 40, 40', 40 . . . . Only two adjacent coils are energised at one time, and the switching on and off of these coils must be synchronised with the motion of the vehicle. The switchovers take place when the secondary (i.e. receiver) coil on the vehicle is substantially half-way between the primed and un-primed coils as in FIG. 10D. In one embodiment the secondary is a ferrite based structure with a bipolar structure provided suitable pole areas at each end that are sensitive to vertical or horizontal flux of either polarity. Thus the primary pads 40, 40' must be switched on/off synchronously but the receiver pads will switch automatically and maximize the power transfer independently of misalignment errors or variable heights.

It will be appreciated that the modes described with reference to FIG. 10 are not solely applicable to ferrite-less pads, but may also be used with ferrite based pad structures, or hybrid structures which contain selected quantities of permeable material that may be lesser than the amount of permeable material conventionally used. Operating a string or series of pads that have no, or little, permeable material has the advantage that the changes in coupling between pad transitions are smoother, so the electronic circuitry used to energise the pads is put under less stress.

Figure 13:
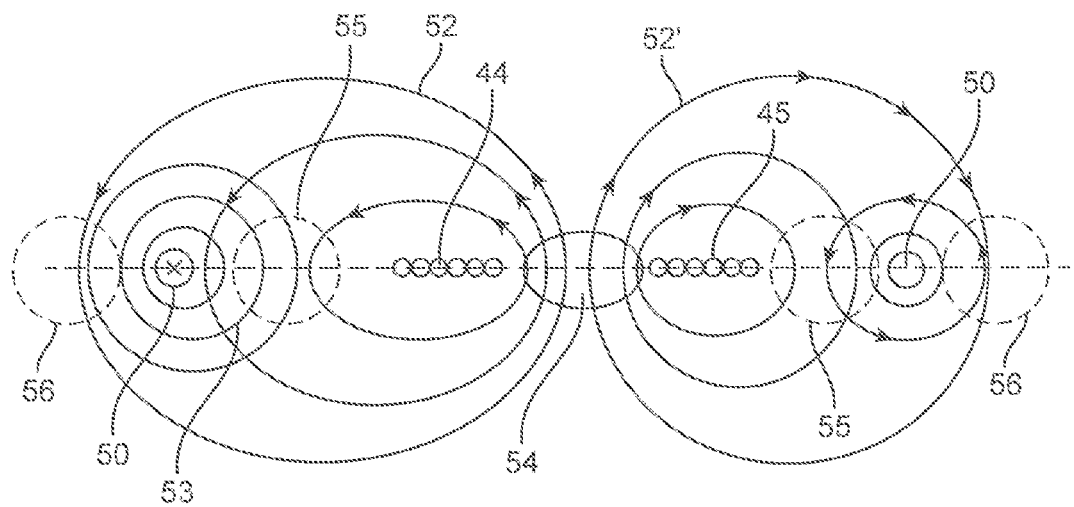
FIG. 13 shows a cross section through 12 illustrating a flux pattern.

FIG. 13 shows a flux plot through the side windings 46 and 47 of the structure 40 of FIG. 11. As shown, the flux is made up of curved whorl-like flux paths 52 and 52' and extends significantly in the horizontal direction. The operation of the cancellation winding 50 can now be described. In this embodiment cancellation winding 50 is a short circuit winding that is located outside i.e. peripherally to the main winding and has a current that opposes the current in the main winding (Lenz's Law) to produce its own flux patterns which are referenced 53 in FIG. 13. The cancellation winding 50 weakens the central flux in the area indicated by reference numeral 54; strengthens the flux between the windings in the areas indicated by reference numeral 55; and weakens the flux outside the cancellation winding in the areas indicated by reference numeral 56. If the flux in areas 56 goes to zero, or near zero, then the complete flux path is no longer viable so the cancellation can spread over a significant area (volume). In a practical situation we have found that a leakage flux of 30 µT at the sides or ends of a pad structure with no cancellation winding can be reduced to less than 5 µT when the cancellation winding is present, and that the cancellation effect extends some distance outside the flux coupling coil 41.

In FIGS. 11 to 13 the cancellation coil is shown positioned peripherally and in substantially the same layer as the coil 41. The cancellation coil 50 can be used in other ways to provide a number of useful options, some of which will be described below. As seen in FIG. 13, the fluxes produced by coil 41 are high above that coil and also low beneath the coil, so the flux cancellation coil 50 can be contoured or positioned to control these fluxes and thus produce a required flux pattern, and in particular to control or minimise leakage flux. Therefore, in one embodiment shown in FIG. 14, a new pad structure 58 is shown in which the cancellation winding 50 is still arranged peripherally of the coil 41, but has side portions 60 that are in one plane or layer and end portions 62 that are in a different plane or layer. Side portions 60 are in a layer shared with the coil 41, and end portions 62 that are positioned in a different plane or layer which is on the opposite side of the coil 41 from flux coupling region 64 above the pad structure. The width between side portions 60 is adjustable to control where the cancellation areas 56 occur. Similarly, the longitudinal distance between end portions 62, and their offset below the coil 41 can be adjusted to control the depth of the flux whorls A and C. In one embodiment the cancellation winding is self powered and is a closed short circuit of 1-4 turns. In other embodiments the cancellation winding can be actively driven.

The use of a cancellation winding 50 can make a pad design completely modular and substantially or effectively decoupled with respect to adjacent pads, so that the resulting structure 58 can be repeated for each pad in a string, and the string can be without a sensible limit. In the example of a roadway application, the cancellation winding 50 can be built into the road structure or matrix when the road is constructed, and the main windings 41 for example can be added and capped at a later time. The pad structure can thus be provided at low cost and be simple to both manufacture and install.

Figure 15:
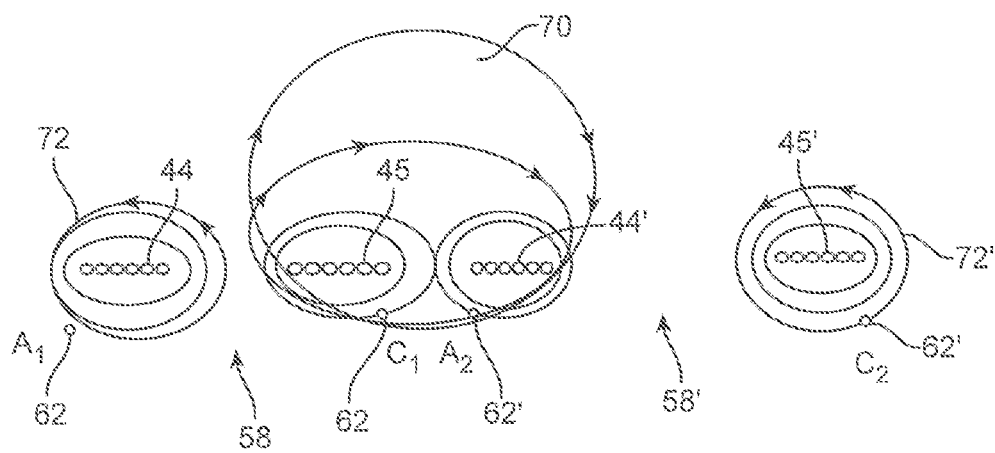
FIG. 15 shows a flux plot on a cross section through two winding arrangements according to FIG. 14 placed side by side

FIG. 15 shows a cross section taken along the longitudinal axis of two adjacent pads 58, referred to as pads 58 and 58' for ease of reference. When a string of pads is placed along a roadway the cross section through the pads can appear as coil conductors 44-45, 44'-45', 44"-45" and so on. Each pairing gives a flux pattern as shown in cross section in FIG. 15. The flux is characterised as having an extensive flux whorl 70 in the middle region between the two adjacent pad structures and extend upward from the pad structure to make a field available to a secondary structure for power transfer. Two lesser flux whorls 72 and 72' are present at the ends of the adjacent pads. This arrangement of two adjacent pads 58 and 58' is functionally similar to a Double D pad design. In a conventional Double D pad design this flux is usually controlled with a ferrite backing, but in this roadway application, and in many other applications, ferrite is not preferred as it is very brittle and the roadway environment is challenging for such a material. With this new arrangement no ferrite backing is used to reduce the back flux emanating from the bottom of the roadway pad into the concrete. Instead, the problem is addressed by the use of the cancellation windings 50 which provide a form of backing by guiding the flux away from the back area of the pad structure.

In operation, if a vehicle is moving over the roadway from left to right as shown in FIG. 15, then the pad energisation sequence is stepped along in synchronism with the vehicle, so that the secondary or receiver pad on the vehicle can continue to receive power. Thus to energise the next pad in sequence pad 58 is turned off and pad 58' is turned on, so the flux whorl 70 moves one pad length to the right. In this way a string of pads may be switched sequentially to power a moving vehicle on a roadway whilst maintaining synchronism at all times.

In one embodiment the cancellation winding 50 may comprise multiple turns at a lower current to get better control of the unwanted back flux. The distance between the flux whorls in the end portion conductors 44 and 45 is a significant part of the design process in order to get the power transfer as smooth as possible as the vehicle moves from one pad to the next. At the transition the 58 to 58' combination shown in FIG. 15, when pad 58 turns off the on-vehicle pad is then perfectly aligned with the pad 58' and the next pad in sequence is turned on, and this process repeats. The use of simple pads that can be paired is a unique feature here made more feasible by the lack of ferrite in the pad structure. In essence the method creates a moving (stepping) pad array but has no moving parts. It also allows for multiple pads to be stepping at the same time—corresponding to multiple vehicles on the road—so that another pad could be a number of pads further advanced in the string and be stepping at the same rate or a different rate, but a stepping pad cannot overlap another stepping pad—but it can step in the opposing direction.

In one embodiment the secondary pad in the vehicle includes ferrite which will receive flux from flux whorl 70 and enhance the flux caused by that winding to give more power transfer from the roadway pad to the in-vehicle pad. In this way the pad switching system takes power from the roadway pad that has the best alignment to the on-vehicle pad and thereby increases the efficiency of power transfer.

Figure 9:
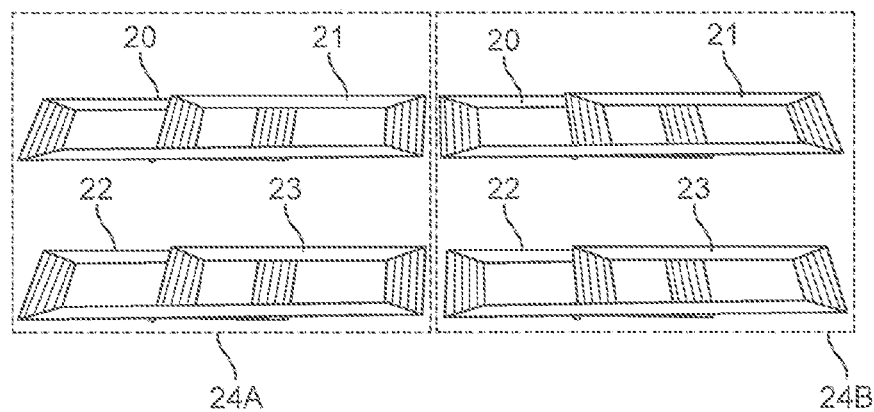
FIG. 9 shows two bipolar pad arrangements according to FIG. 8, located side by side.
Figure 16:
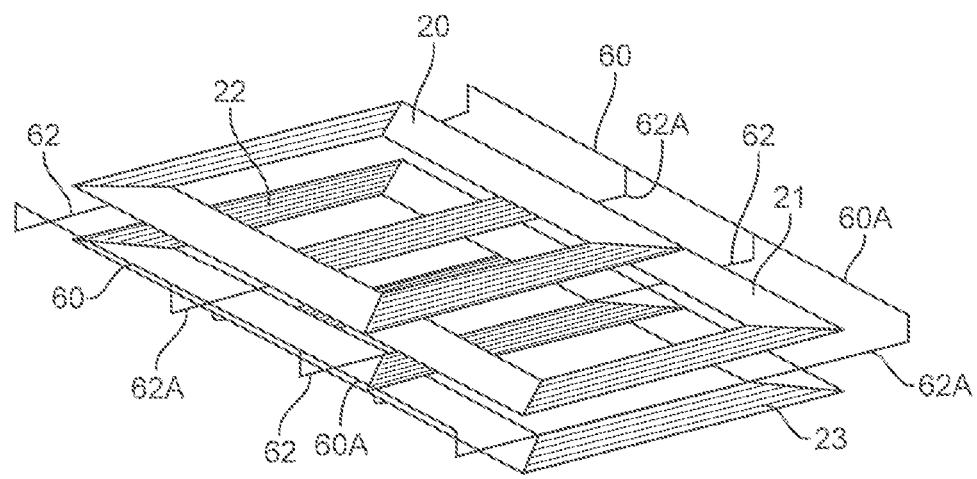
FIG. 16 shows an isometric view of a bipolar coil arrangement with an additional cancellation winding.

For the more complex windings of FIGS. 8 and 9 similar side flux cancellation windings can be produced as shown in the embodiment of FIG. 16. In FIG. 16 the reference numerals used to denote features of the FIGS. 8 and 9 embodiments are again used to denote like features, and the reference numerals used in FIGS. 14 and 15 to denote features of the cancellation winding are also again used to denote like features.

Referring to FIG. 16, two cancellation windings 50 are provided. As described above these winding include side portions 60 along each side of the pad structure, and end portions 62. The cancellation windings 50 are positioned around the coils 20 and 21 of the pad structure and overlap so that they are decoupled from each other. For clarity, because it is not very clear in the drawing, side portions 60 that relate to coil 21 are labelled 60A, and end portions 62 that relate to pad 21 are labelled 62A. Consequently as the pad is made to operate with coils in or out of phase the cancellation windings will operate to naturally change their operation in and out of phase to suppress leakage flux on the sides and assist with shaping flux where necessary at the ends of the coils.

Figure 17:
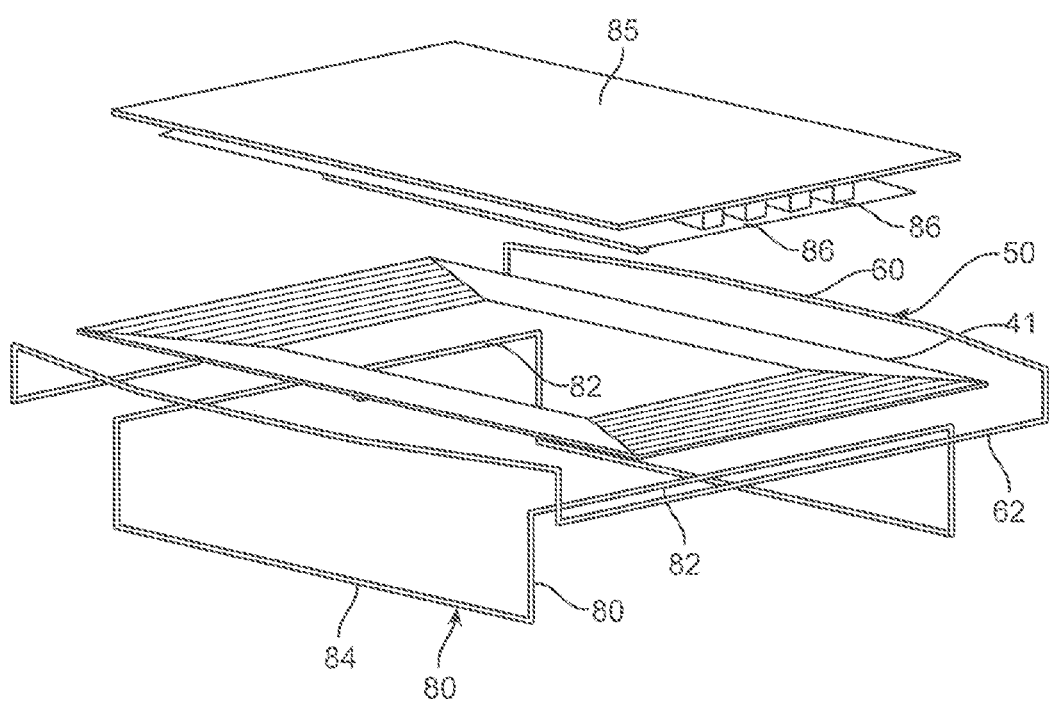
FIG. 17 shows an isometric view of yet another form of pad structure having a first flat coil, but having two cancellation coil arrangements, and a secondary which comprises a bipolar pad arrangement.

A further embodiment is shown in FIG. 17 in which a bipolar secondary or pick-up pad 85 is shown positioned over a flat primary pad 58 having a flux producing coil 41, a passive flux cancellation coil 50 and a passive flux cancellation coil 80. Although coils 50 and 80 are shown as passive (i.e. shorted) in this embodiment, it will be understood that one or both coils may be active (i.e. driven) in other embodiments. It will also be understood that the secondary structure 85 may take a variety of different forms. In this example it comprises a bipolar structure similar to that disclosed in patent publication WO2012/018269, and includes ferrite in the form of a number of elongate bars 86.

Figure 14:
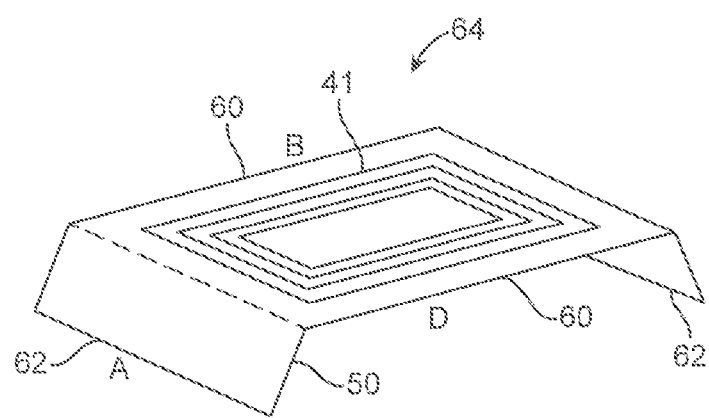
FIG. 14 shows a different form of cancellation winding or coil for the arrangement of FIG. 11.
Figure 18:
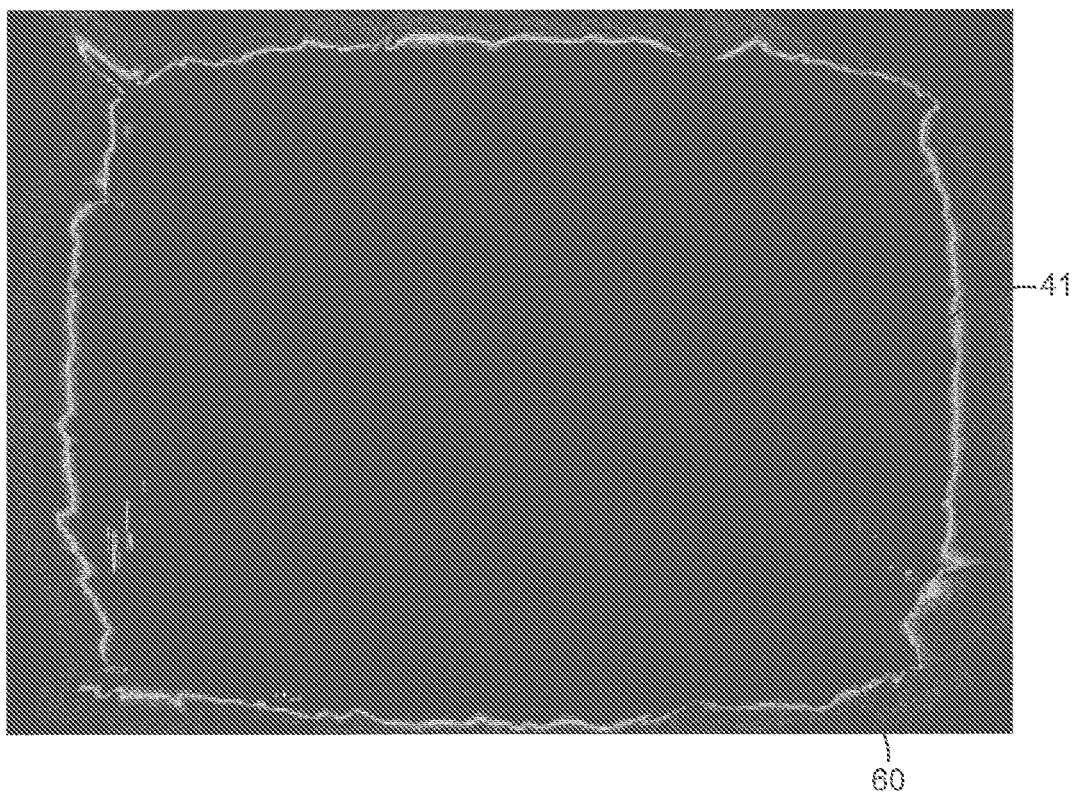
FIG. 18 shows a simulated magnetic flux pattern taken in cross section in a horizontal plane between the primary and the pick-up in FIG. 17.
Figure 19:
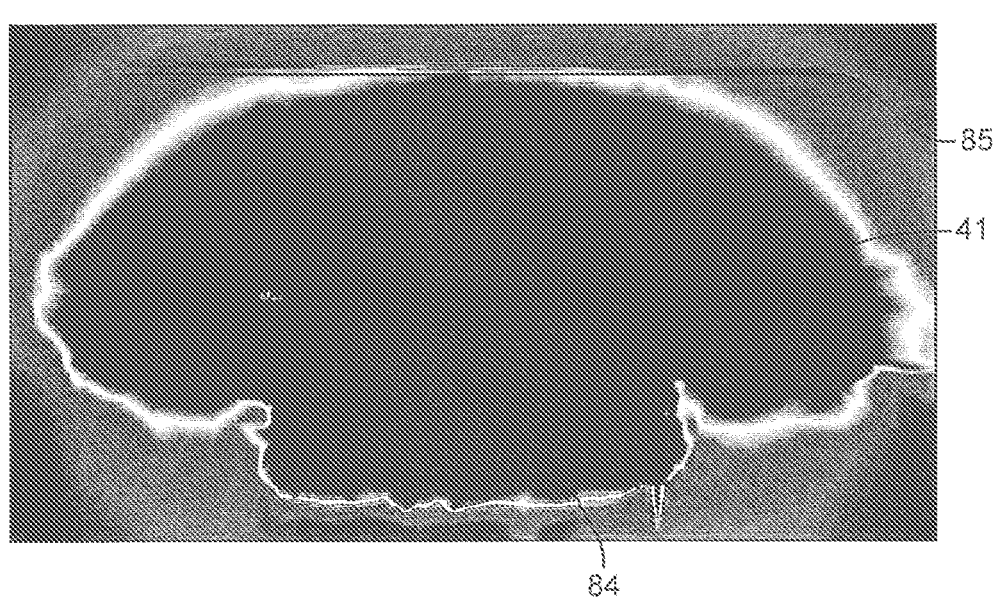
FIG. 19 shows a cross section of a simulated flux pattern taken on a vertical plane through the middle of the arrangement of FIG. 17 on the longitudinal axis.
Figure 20:
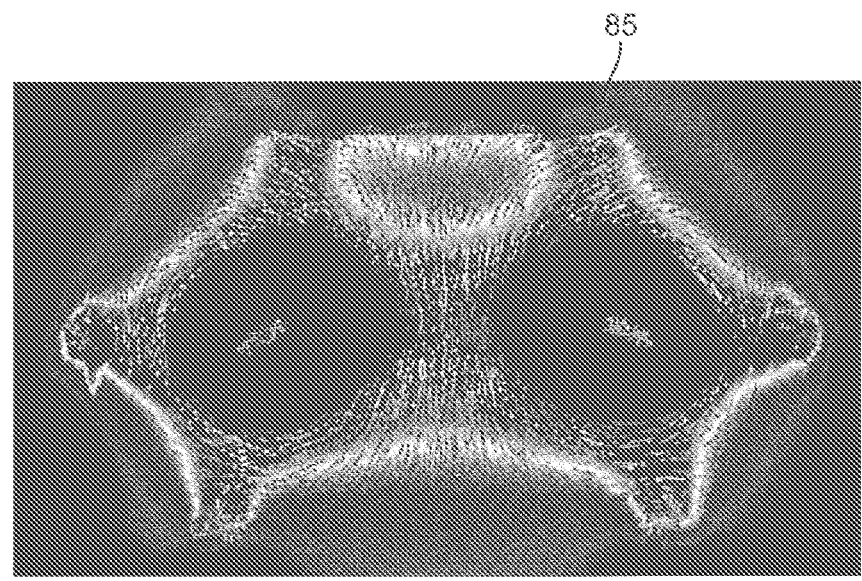
FIG. 20 shows a simulated flux pattern through a cross section in the vertical plane in a transverse direction through FIG. 17.

Coil 50 is configured to function as described above with reference to the passive coils shown in FIGS. 14 and 15 for example, and as described above the side sections 60 of passive coil 50 act to prevent unwanted flux at the side areas of primary coil 41, and end section 62 are positioned at the ends of primary coil 41 so as to provide a required flux pattern at the end portions. Similarly, coil 80 has end portions 82 that are associated more closely with primary coil 41 than side portions 84 of coil 80 to thereby couple sufficient flux into coil 80 so that side portions 84 of coil 80 can control the lower flux pattern i.e. control the amount of flux at the back of the overall pad structure. FIG. 18 shows a horizontal cross section through the horizontal plane A-A of the arrangement of FIG. 17. FIG. 19 shows a cross section in the vertical plane B-B through the middle of the arrangement shown in FIG. 17 along the longitudinal axis. FIG. 20 shows a cross section to the arrangement of FIG. 17 in the vertical plane C-C in a transverse direction i.e. perpendicularly to the longitudinal axis of coil 41.

Figure 21:
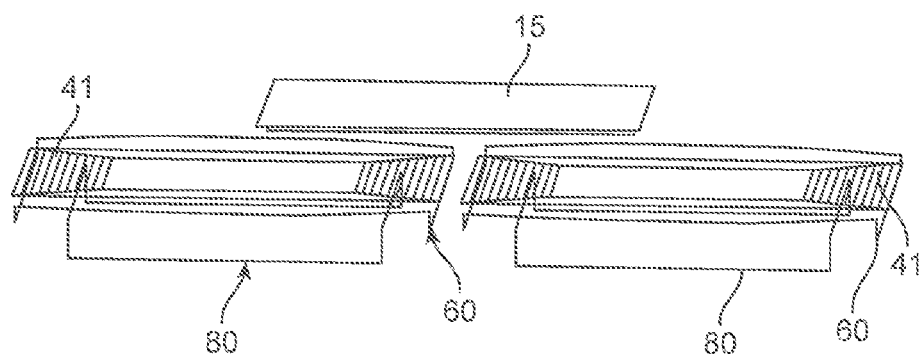
FIG. 21 shows two of the arrangements of FIG. 17 located side by side with a pick up located above and spanning the two pad arrangements.
Figure 22:
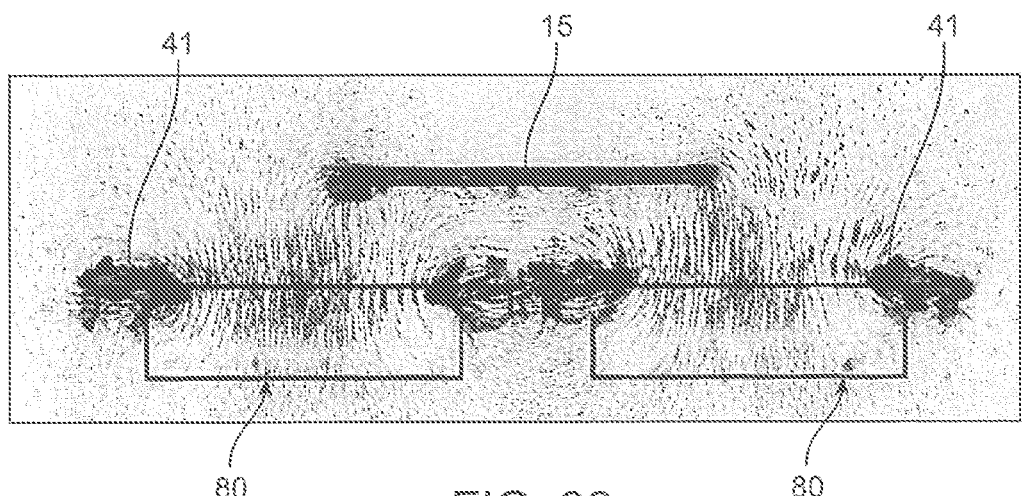
FIG. 22 is a simulated flux pattern taken in the cross section in the vertical plane along the longitudinal axis of the arrangement shown in FIG. 21.

In FIG. 21, two of the arrangements illustrated in FIG. 17 are shown side by side with pick-up 85 shown in a position in which it is bridging the gap between the pad structures, and the flux pattern produced through a cross section along the longitudinal axis in a vertical plane A-A is shown in FIG. 22.

Figure 23:
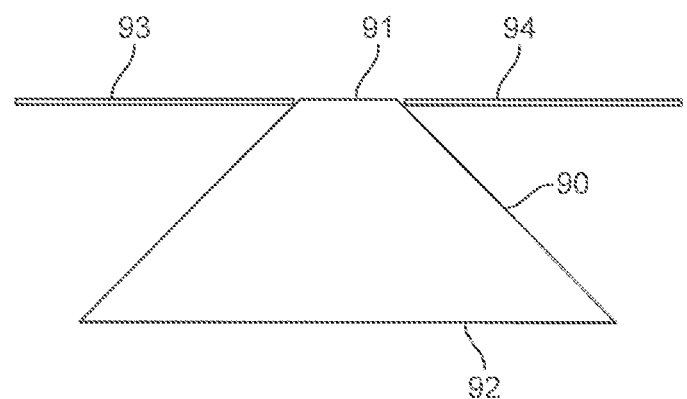
FIG. 23 is a side elevation of another form of flux coupling apparatus.
Figure 24:
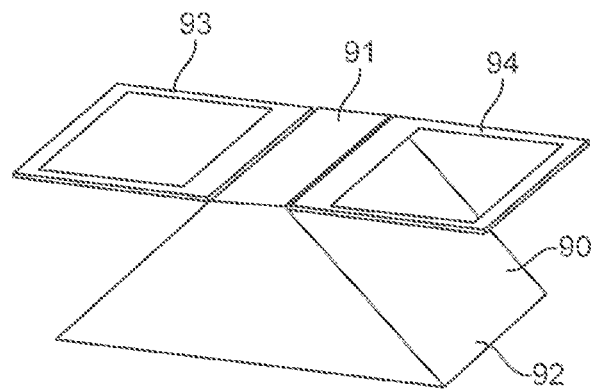
FIG. 24 is an isometric view of the apparatus of FIG. 23.

Referring to FIGS. 23 and 24, an alternative embodiment of pad structure is shown. The pad structure has a central coil 90 which is solenoidal in nature but has a substantially trapezoidal cross section. Coil 90 can be provided in a variety of different shapes when viewed along the central axis in which the section has been taken in FIG. 23. In one embodiment it may appear circular, but in other embodiments it may appear rectangular or trapezoidal for example. Thus the turns of coil 90 may include a first or upper layer 91 and a second or lower layer 92 which similarly extends into the page. The turns of the coil are positioned more closely together at the upper layer 91 and spaced further apart at the lower layer 92 to allow flux produced by the coil 90 to extend upwardly into a region for coupling with another structure for wireless power transfer. Flux is guided by the use of coils 93 and 94 which are positioned at either end of the central coil 90, and prevent back flux by guiding the coupling flux into and out of coil 90. It will be seen by those skilled in the art that the central coil 90 could in another embodiment be replaced by a simple solenoidal coil and still have flat coils 93 and 94 at either end thereof guiding flux into and out of the central solenoid shaped coil.

It will also be apparent those skilled in the art that in some embodiments the end coils 93 and 94 may not be required, and instead a central coil 9 having a trapezoidal cross sectional shape may be constructed which achieves the required flux path to produce the arch shaped coupling flux 95 on the upper side of the pad structure. Coils 93 and 94 act in a similar manner to the Double D construction which is explained further below.

Figure 25:
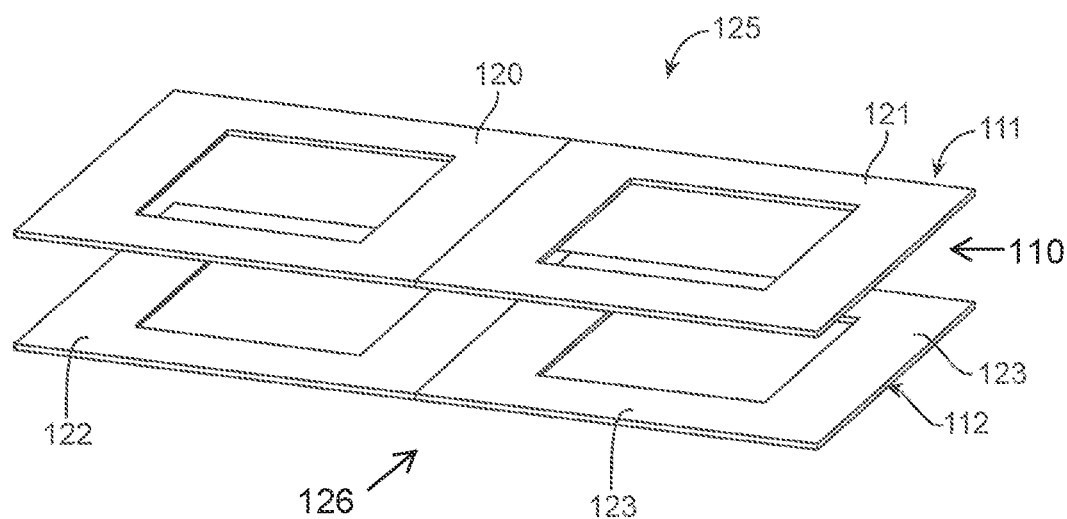
FIG. 25 shows a DD ferrite-less structure (a) according to one embodiment of the invention with single sided flux pattern shown in cross-section flux plot (b).

Turning now to FIG. 25, a ferrite-less lumped magnetic structure 110 is shown which takes a form described earlier in this document as a Double D pad in accordance with the principles described in international patent publication WO 2010/090539.

As can be seen from FIG. 25, the overall structure 110 comprises a first upper structural layer 111 and a second lower structural layer 112. Each of the layers 111 and 112 comprises two coils which are arranged side by side and in substantially the same layer, which in this example is planar. Such a layer may take a variety of forms, for example it could curve or undulate. It will be appreciated by those skilled in the art that although separate coils are shown for structure 110, these may all be formed as a single winding. For example the coils may be found in wound in series, as may coils in other embodiments described herein. As mentioned above, the principles behind this arrangement are described in WO 2010/09053. However, the difference is the use of the two layers 111 and 112, as opposed to a single layer.

Figure 27:
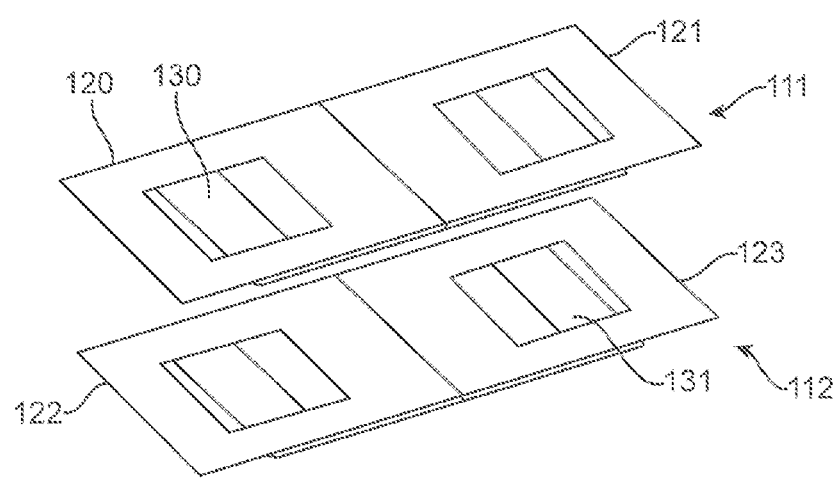
FIG. 27 shows an isometric view of a single sided ferriteless DDQ pad according to one embodiment of the invention.

Layer 111 comprises adjacent coils 120 and 121. Both coils may be operated in a complementary manner (for example being energised by alternating currents but with a 180 degree phase difference between the coils) to establish a field extending from the pole formed by one coil to the other. Although rectangular coils are shown in FIG. 27, other coil shapes may be used in other embodiments, for example oval, circular, square or irregular shapes.

Still referring to FIG. 25, coils 122 and 123 are located below coils 120 and 121 respectively. Following on from the disclosure above, the coils 122 and 123 may be used to control the field produced by coils 120 and 121. Thus coils 122 and 123 may be used to control the field produced by the pad structure comprising the four coils 120-123 i.e. to shape the field in the flux coupling region 125 above the structure and/or reduce the field that would other wise be present behind or below the structure in region 126. In this embodiment, coils 122 and 123 are co-axially aligned relative to coils 120 and 121, but as described elsewhere in this document the relative coil dimensions and alignment may vary depending upon the flux pattern that is required to be achieved in use. Again, the coils 122 and 123 may be arranged in a layer that is not necessarily planar and does not necessarily replicate the contour of the layer in which the coils 120 and 121 are provided.

The upper coils 120 and 121 shown in FIG. 25 can be wound with 2N or 3N windings for example and the lower coils 122 and 123 can be wound with N windings, although other options maybe used based on the desired flux pattern.

Coil 122 is coupled with coil 120, and coil 121 is coupled with coil 123. In one embodiment coil 122 will be driven out of phase (180 degrees) from coil 120, and coil 123 will be driven out of phase (180 degrees) from coil 121. In practice this can be achieved by simply connecting coils 120 and 122 as one winding but wound in opposite directions (and also winding and connecting coils 121 and 123 in this same manner). As such, if coil 120 or 121 is activated to produce a north pole at its centre then coil 122 or 123 has currents flowing to produce a south pole which however is weaker because coils 122 and 123 have fewer turns. In another embodiment, coils 122 and 123 could simply have shorted turns, so that the flux coupling from the operation of coils 120 and 121 causes currents to flow in each of these coils that is out of phase and would achieve a similar but less controlled result.

In operation, the coils may all be driven from a single inverter. Alternatively, coils 120 and 121 may be individually driven from two resonant inverters having synchronised currents, so that these coils can be operated in a controlled and desired manner to create a required field. Because of the connections (either physical or by coupling) of coils 122 and 123 to the upper coils 120 and 121, coils 122 and 123 will operate to support this field creation and suppress back flux from the pad.

Figure 26:
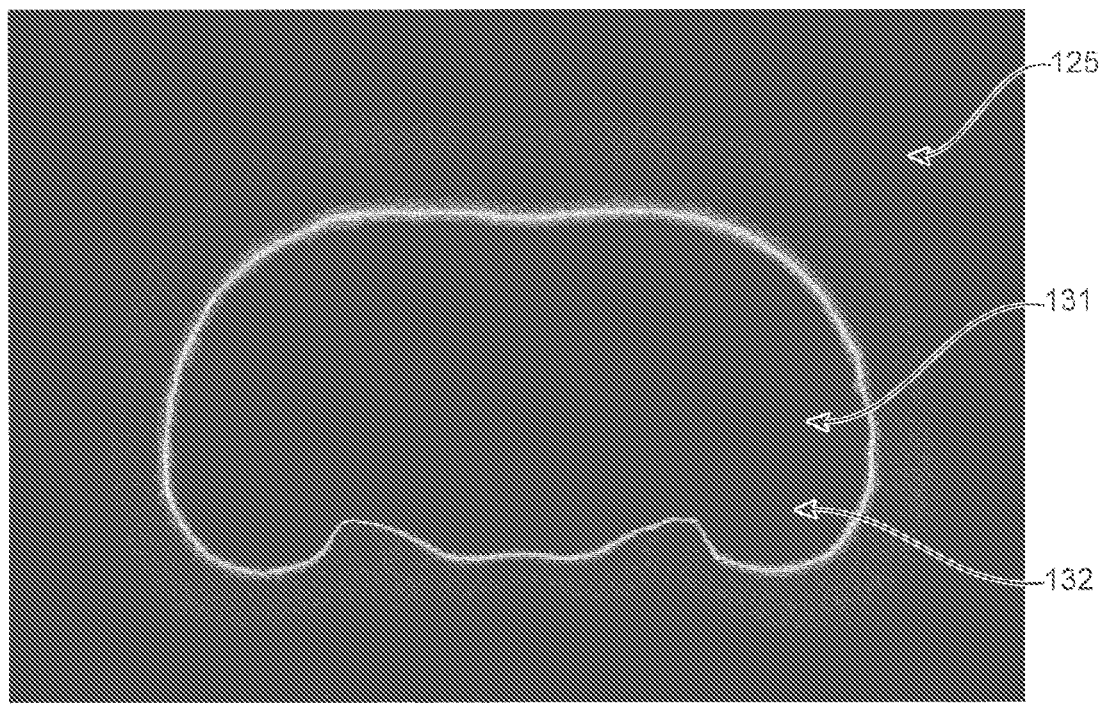
FIG. 26 is a flux plot in vertical cross section along the longitudinal axis of the structure of FIG. 25.

As can be seen in FIG. 26, structure 110 of FIG. 25 provides an effective coupling flux in a region 125 beyond a front face (i.e. vertically above structure 110 in FIG. 26) while controlling or limiting the flux in the region 126 at the back of the structure i.e. below structure 110 in FIG. 27.

The use of an active or passive cancellation coil can be extended to multi-phase structures. Referring to FIG. 27, a structure in accordance with FIG. 26 is shown, but having an additional coil 130 in upper layer 111, and a corresponding additional coil 131 in lower layer 112. Additional coil 130 is adapted to produce or receive a flux component that has a different direction to that produced or received by coils 120 and 121. For example, coil 130 may be considered to produce flux in a vertical direction, while coils 120 and 121 may be considered to produce flux in a horizontal direction. Thus coil 130 can produce a field in spatial quadrature to the field produced by coils 120 and 121. Coil 130 may be positioned as shown relative to the coils 120 and 121 to overlap them in a balanced manner so as to be minimally coupled with those coils i.e. to be substantially or completely decoupled from them. Therefore the combination of coils 120, 121 and 130 comprises a two phase decoupled topology.

In operation, polarised fields are created by coils 120 and 121 and the spatial quadrature field is created by the centred square/circular coil 130 shown in FIG. 27. The coil 130 may be squarer in shape and may be smaller or even larger than the coils 120 and 121. If coil 130 is required to be larger, then in some embodiments it can be provided as an outer peripheral winding with coils 120 and 121 provided within the circumference of coil 130.

Coil 131 of the second layer is coupled with coil 130 (but minimally coupled or substantially decoupled from coils 122 and 123) to act as a cancellation coil as described above. Therefore, coil 131 can be passive or active, and used to control the flux pattern for the structure as described with the flux cancellation coils described elsewhere in this document.

Referring to FIGS. 25 and 26, it will be seen that the apparatus can be provided as an IPT secondary structure. In one embodiment an appropriate shield, for example an aluminium backing plate (not shown) may be provided beneath the layer or structure 112 to further control flux if required, and layer or structure 111 may be physically moved, for example being raised, toward a primary structure from which a magnetic field is generated until an appropriate position has been determined for effective power transfer. This arrangement may be convenient for vehicle charging applications for example such as trucks or buses in which the arrangement shown in FIG. 25 is inverted, with structure 112 being provided on the base of the vehicle, and structure 111 being lowered below the base when power transfer is required. The separation distance does not need to be manually varied in some applications, but it may be advantageous to vary it in order to provide the most effective or efficient power transfer, or to control this breed of magnetic fields which occur while power transfer is taking place. A control system may be provided to perform the required adjustment of the distance or relative position between the structures 111 and 112 depending upon the required parameter i.e. magnitude of power transfer, efficiency of power transfer or field characteristic.

As mentioned above, the arrangement shown in FIG. 25 can also be used as a primary side structure for generating magnetic flux, for example being provided in a roadway. Since permeable magnetic material such as ferrite is not required to be present, the structure has a number of advantages since any material having a low magnetic permeability may be provided between or around structures 111 and 112, for example concrete.

Combining the above concepts, it is now possible to develop a complete family of single sided ferrite-less magnetic flux coupling structures (e.g. pad) options which together can be used in an almost limitless number of different applications. For example they may be used within a roadway system as individual pads, formed as side-by side pads or track segments as part of the roadway or even on the vehicle pad depending on size or thickness. They may also be used in low power applications for power transfer to small appliances.

This family of pads utilise upper windings with higher NI where the field is shaped to be presented above the pad and a lower winding structure which is identical but connected in reverse to the upper winding for flux shaping and suppression of flux at the back of the pad (creating a single sided flux path relative to the pad structure). This family of topologies may include a DD polarised structure without ferrite as in FIG. 25 where in operation the flux is shown to be predominately out the top side of the pad as shown in FIG. 26, or even two phase decoupled topologies such as the DDQ as shown in FIG. 27.

Figure 28:
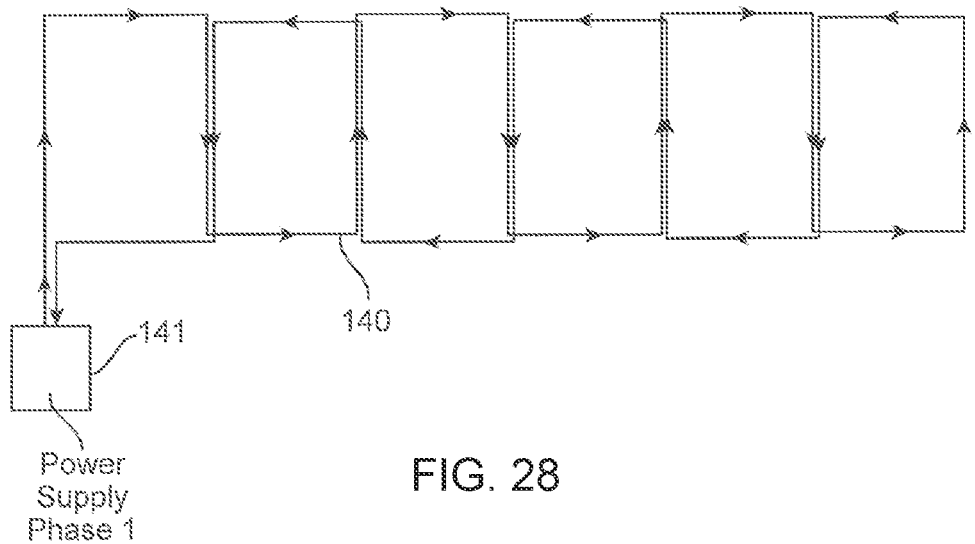
FIG. 28 shows a known single phase track (a) powered with current directions shown having fields front and back

A known single phase track topology with two sided fields is shown in FIG. 28 where due to the current directions in the windings there are alternating north and south poles along the length of track 140 which is driven by power supply 141. Using the proposed structures for the single phase pads discussed earlier, now a single sided field can be produced above the track (without the need for ferrite) by completing the track using an identical structure 140' positioned some distance below the main windings which operates a lower NI and currents that are 180 degrees out of phase to the upper winding as shown in FIG. 29.

Figure 30A:
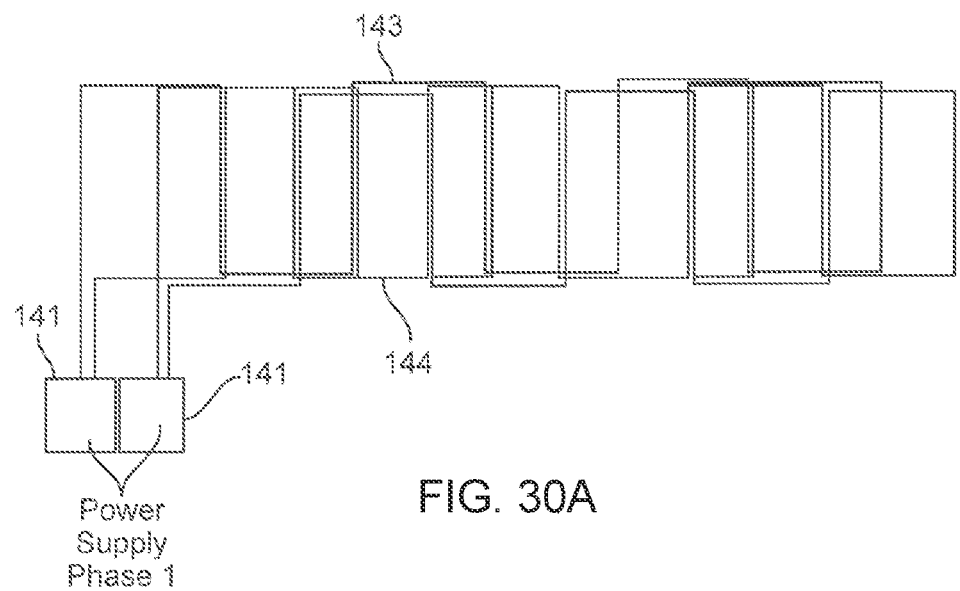
FIG. 30A shows a known two phase decoupled track structure with two sided fields
Figure 30B:
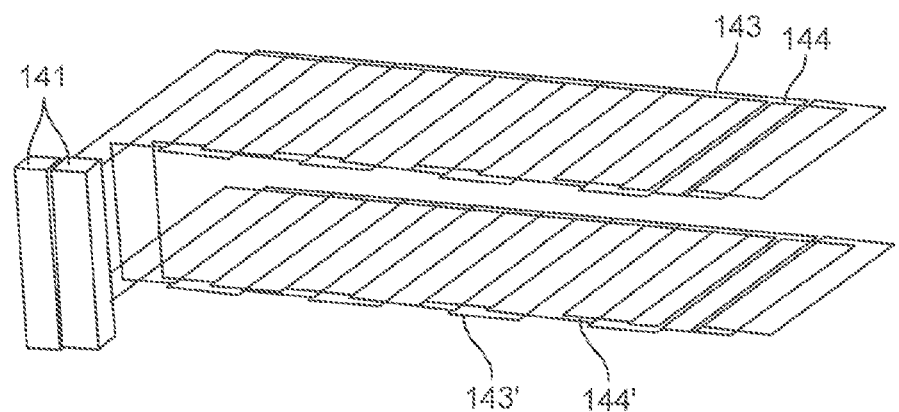
FIG. 30B shows a modified two phase track structure using the proposed reverse coils to achieve fields only above the track structure and not below.
Figure 30C:
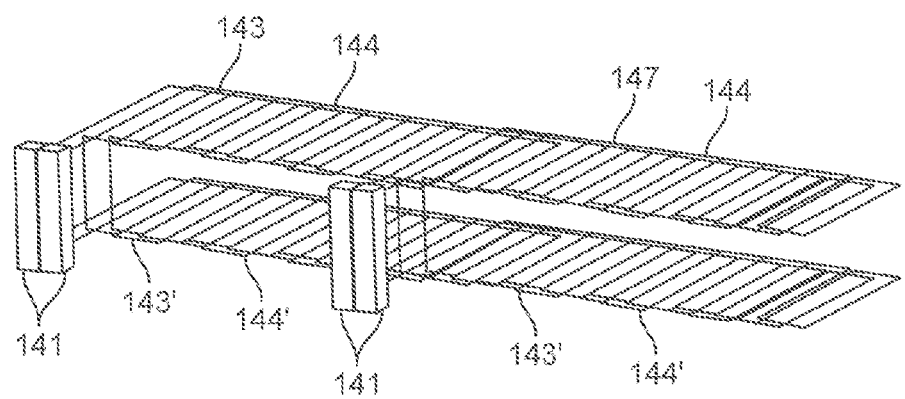
FIG. 30C shows connection of long tracks using multiple energised two phase track sections

The single phase track of FIG. 28 can be converted to a known two phase track structure with decoupled windings 143 and 144 due to the spatial overlap shown in FIG. 30A, and using the proposed technique a single sided field structure can be achieved without the use of ferrite as in FIG. 30B by adding cancellation or reflection windings 143' and 144'. This track can be extended in any direction by simply adding additional sections which can be separately energised and cascaded along the complete length of a roadway or trackway as in FIG. 30C (where two sections are shown). Each section is only energised if and when a vehicle is present above that track section.

Figure 29:
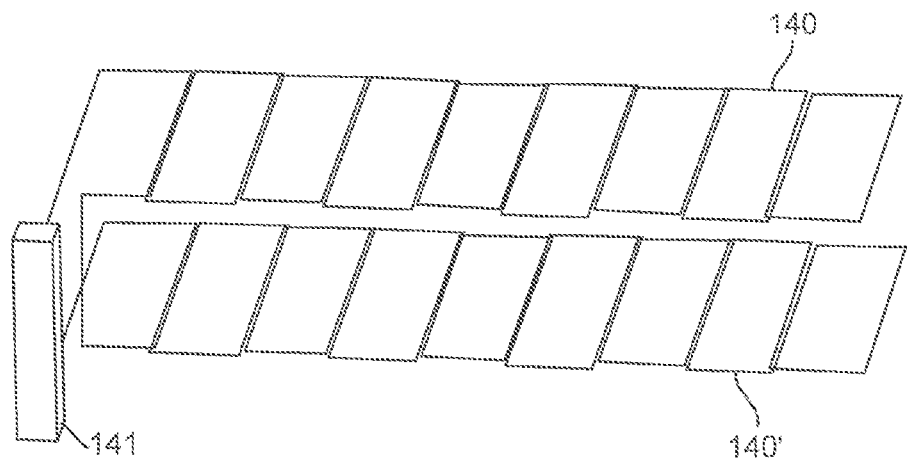
FIG. 29 shows a single phase track structure according to embodiments of the invention, which uses the proposed reverse coils with greater NI ratio in the upper coil (typically 3:1) to achieve fields only above the track and not below.
Figure 30D:
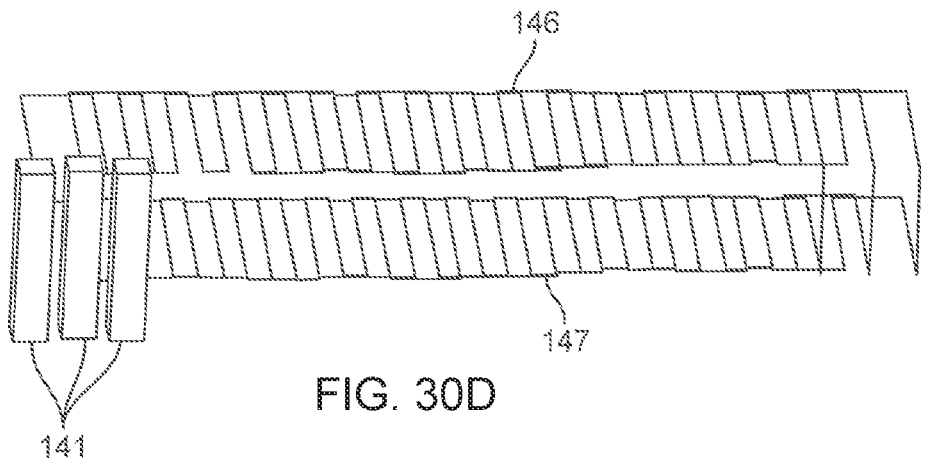
FIG. 30D shows a three phase track structure according to an embodiment of the invention.

Alternatively the two phase track of FIG. 29 can be replaced by a three phase single sided track topology as shown in FIG. 30D which has phase windings 147 and reflection windings 147' where the upper and lower parts of the track are energised out of phase with the upper winding having a greater NI (usually 2-3 times) that of the lower part of the winding to create the desired single sided moving field (although here the tracks will have constant and essentially balanced mutual coupling rather than the decoupled nature of the two phase track).

Figure 31:
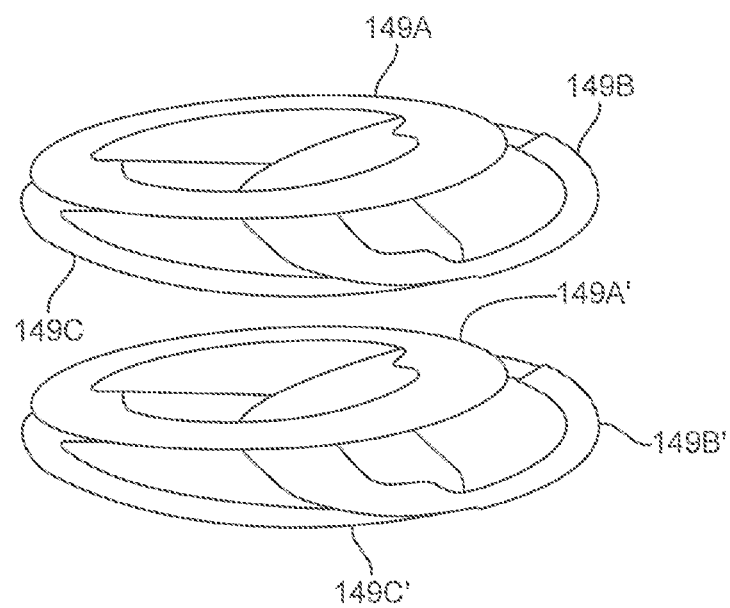
FIG. 31 shows an isometric view of a three phase pad structure according to an embodiment of the invention.

A three phase single sided pad with independent decoupled windings 149A, 149B and 149C, and reflection windings 149A', 149B' and 149C' can also be created using this same concept as in FIG. 31.

It will also be seen to those skilled in the art that the structures described in this document can be provided at varying scales. Thus in addition to the examples relating to wireless charging for electric vehicles which have been described above, the apparatus is also applicable to powering much lower power devices, for example personal electronic devices such as watches, cellular phones and other mobile computing or communication devices for example.

Figure 32:
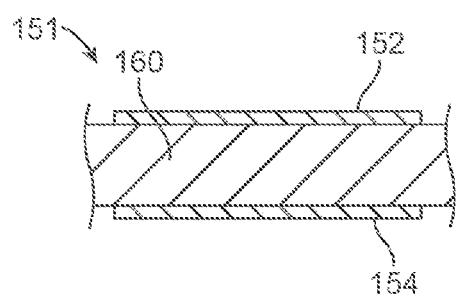
FIG. 32 shows a cross section through a PCB having a coil arrangement according to an embodiment of the invention.

In one embodiment, the arrangement as shown in FIG. 32 (and in other Figures described herein) may be formed such that a wireless power transfer structure 151 comprises a first layer having coil 152 comprising a number of turns of conductive material on one side of a substrate that is used to mount or position electronic components such as a printed circuit board 160 (PCB) structure or similar material, and a second layer comprising coil 154 which is formed from conductive material on the other side of the PCB. Such an arrangement has the advantages that magnetic material, especially fragile magnetic material such as ferrite, is not required, the overall magnetic structure is simply and easily manufactured and is very easily provided in an electronic device such as a cellular telephone. It also achieves a significant weight saving. In one embodiment the turns of one layer may be printed onto one side of the PCB, and turns of the other layer may be printed onto the opposite side of the PCB. This is shown diagrammatically in FIG. 32 which is in cross section showing upper coil 152 printed on one side of PCB 40 and coil 154 printed on the opposite side.

Another embodiment is shown in FIG. 33 (again a cross section) in which, a multi-layer PCB 161 is provided, in which the turns 162 of the first coil or layer of the magnetic structure are printed over a number of PCB layers adjacent to one side of the multi-layer PCB, and turns 163 of the second coil or layer of the magnetic structure are printed over a number of PCB layers adjacent to the other side of the multi-layer PCB.

These potential applications allow the PCB or similar material to be used as the flux guide without any need for brittle ferrite. They have the advantage that they may be used in appliances for power transfer at very low power ensuring single sided fields are generated which are shaped so that they do not penetrate further into the appliance. The single sided nature of the field shaping minimises the need for significant aluminium or copper shielding (which otherwise would get hot in the device and lower efficiency). Furthermore both the primary and secondary can be ferrite-less and therefore there is no chance of detuning due to the presence of ferrite or a similar permeable material under movement or normal operation if appropriate tuning is used to ensure the self inductance of the primary and secondary do not change with relative position. Therefore any object which causes detuning is not a suitable device for power transfer and the system can be designed so that power transfer does not occur under these conditions. Accordingly such ferrite-less systems (for both high and low power applications) can be designed to facilitate detection of foreign objects in the vicinity or region in which power transfer occurs.

As mentioned above, a vehicle pad comprising the first layer or part of the winding with the higher NI can be lowered closer to the ground when power transfer is needed with the ground pad which may be either a complimentary ferrite-less pad or ferrite loaded pad with the second part of the winding carrying the smaller NI left fixed to the body of the vehicle. This is particularly advantageous for vehicles with a high ground clearance, since when stationary or moving on a highway only a portion of the wireless pad is lowered into place. This can mean that either the roadway or vehicle pad or both can be ferrite-less, while still ensuring the fields are shaped as desired. A further advantage if both pads are ferrite-less is that the problem of detuning due to proximity of the neighbouring ferrite in the second pad is removed so that a foreign object with ferrous material, if placed in the gap, should now be easier to detect.

Figure 34:
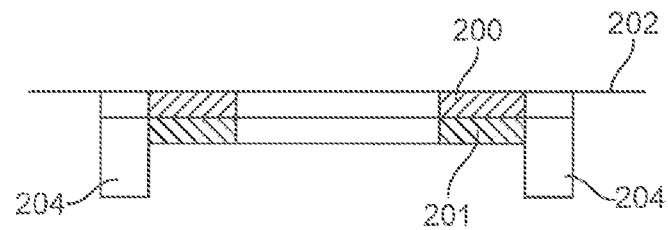
FIG. 34 is a diagrammatic cross-section through part of a structure including coils for a flux coupling structure is a retracted position.
Figure 35:
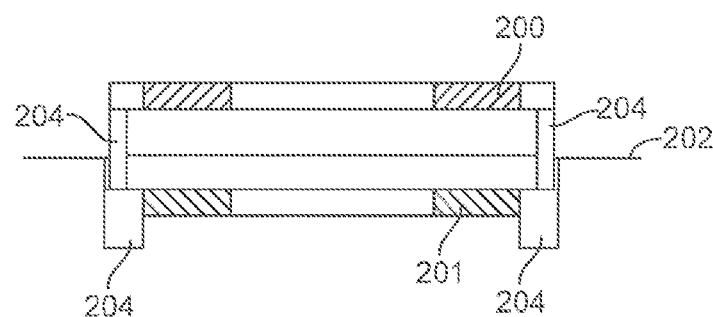
FIG. 35 is another view of FIG. 34, but with the apparatus in an extended position.

Referring to FIGS. 34 and 35, an embodiment in which a coil may move relative to another coil for the purposes of making a field available for coupling is illustrated. A first coil 200 is provided adjacent to a second coil 201 which is stationary, being provided in a roadway for example. Coil 200 is provided adjacent to surface 202 which may be a roadway surface for example. First coil 200 is supported by actuators 204 which may for example comprise linear actuators which may be operated electrically (with suitable shielding), mechanically, pneumatically or hydraulically.

These actuators allow the coils 200 and 201 to move relative to each other. Therefore, in FIG. 35, actuators 204 have been operated to move first coil 200 to an extended position in which it projects from the adjacent surface such as roadway surface 202. In use, the first coil 200 may be moved to the raised position as shown in FIG. 35 so that it is nearer to a secondary structure provided on a vehicle located over the roadway surface of FIG. 35. When disposed in the orientation shown in FIG. 34, the adjacent pad structures may be inoperable. Then, when the vehicles in their appropriate position over the pad structure, actuators 204 may be used to raise the first pad 200 to the position shown in FIG. 35, and the pad may be energised as described earlier in this document with coil 200 producing coupling flux and coil 201 being spaced at the required distance relative to coil 200 but energised so as to create an appropriate cancellation field and thus provide the coupling flux in the direction over the top of the pad structure for reception by the vehicle.

It will be appreciated that the pad structure in FIGS. 34 and 35 may be inverted and used on another apparatus such as a vehicle which can use actuators 204 to lower a pad structure 200 toward a roadway for example so as to enable the pad to be actuated as a receiver (or as a producer or flux and bidirectional systems) while also reducing the distance between the vehicle and the roadway so that the required coupling can occur.

For example, coil 200 could be lowered when the vehicle is stationary and located over a suitable roadway flux coupling structure. In another embodiment, coil 200 could be lowered while the vehicle is moving on a suitable section of roadway which has one or more energised flux coupling structures. One of the advantages of such an arrangement is that since there is no ferrite present in coil 200 the coil is quite robust and is unlikely to be significantly damaged by random objects in the roadway for example. Furthermore, coil 200 will be light and could be encased in an appropriate material such as a plastics material or possibly a ceramic material so that it is easily lowered from the vehicle and is relatively inexpensive, particularly if it needs replacement for any reason. Moreover, as we describe further below, the coil (or coils of the magnetic structure) which is lowered may be designed with other physical properties in mind to improve performance in a roadway environment. In one example, the coil 200 may be substantially planar and encased in a material which is shaped to have suitable fluid/aerodynamic properties such that it uses a boundary layer effect for example to maintain a substantially constant distance from the roadway while the vehicle is moving at speed. Other shielding such as aluminium can be used between the vehicle and the pad if required. The reduction in ferrite or similar permeable material can advantageously reduce vehicle weight.

The separation distance does not need to be manually varied in some applications, but it may be advantageous to vary it in order to provide the most effective or efficient power transfer, or to control the form of magnetic fields which occur while power transfer is taking place. A control system including apparatus such as that described earlier in this document with reference to FIG. 6 may be provided to perform the required adjustment of the distance or relative position between the structures depending upon the required parameter i.e. magnitude of power transfer, efficiency of power transfer or field characteristic.

It will also be seen to those skilled in the art that the above described (and for that matter the other structures described in this document) can be provided at varying scales. Thus in addition to the examples relating to wireless charging for electric vehicles which have been described above, the apparatus is also applicable to powering much lower power devices, for example mobile electronic devices such as watches, cellular phones and other mobile computing or communication devices for example.

These potential applications allow a PCB for example to be used as the flux guide without any need for brittle ferrite. They have the advantage that they may be used in appliances for power transfer at very low power ensuring single sided fields are generated which shape the field and do not penetrate further into the appliance—the single sided nature of the field shaping minimises the need for significant aluminium or copper shielding (which otherwise would get hot in the device and lower efficiency). Furthermore both the primary and secondary can be ferrite-less and therefore there is no chance of detuning under movement or normal operation since the self inductances of the primary and secondary do not change with relative position. Therefore any object which causes detuning is not a suitable device for power transfer and the system can be designed so that power transfer does not occur under these conditions. Accordingly such ferrite-less systems (for both high and low power applications) can be designed to facilitate detection of foreign objects in the vicinity of region in which power transfer occurs.

There are however other ways in which two or more coils can be used. For example, intermediate resonant structures may be provided in order to extend the distance over which an effective field for power transfer can be provided. Thus, the multiple coil structures described above can additionally be used to energise an intermediate resonant coil provided in a roadway or on a vehicle for instance. Moreover, the intermediate coil may be moved relative to the roadway or relative to the vehicle using apparatus such as that described with reference to FIG. 6 in order to extend or otherwise control the field.

Figure 36:
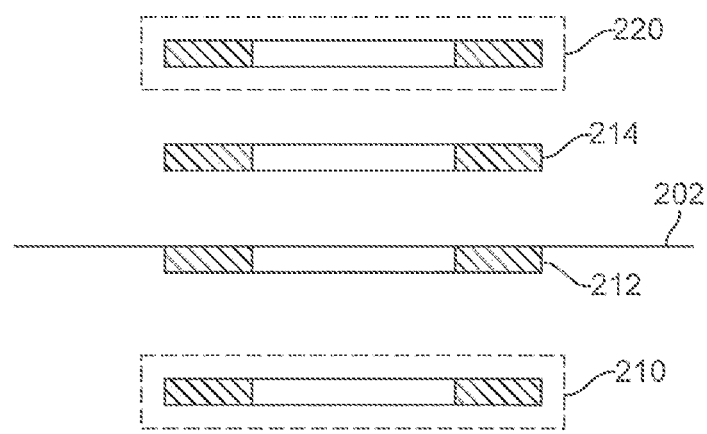
FIG. 36 is a diagrammatic cross section of primary, intermediate, and secondary structures according to a disclosed embodiment.

Referring now to FIG. 36 a diagrammatic cross-section through a roadway is shown. In this example the lowermost coil structure 210 is provided in a roadway. Coil 210 may comprise a ferrite based structure, or could comprise a ferrite-less structure, for example as described elsewhere in this document. The receiver structure 220 receives power from the roadway and this structure may also be a ferrite or ferrite-less structure. Moreover, both structures 210 and 220 could in themselves comprise multiple coil flux coupler arrangements.

Still referring to FIG. 36, there are two intermediate flux coupling structures. The first is pad 212 which is located adjacent to surface 202 of the roadway. The second intermediate structure is pad 214 which can be lowered from the vehicle. The intermediate pads 212 and 214 can simply be tuned (either by their inherent design or by using a capacitive element) to be resonant at or near the required frequency for inductive power transfer between the structures 210 and 220. These intermediate resonant, or near resonant, structures or couplers operate between the primary and secondary pads (or other intermediate structures) and can extend the distance over which a field can extend.

The FIG. 36 example allows the bottom coil 210 to be provided deep in the road where it is insulated from traffic disturbance and thus could include ferrite. The flux that reaches pad 220 causes that to resonate and thus extends the field above the roadway surface. As mentioned above, coil 212 could be a self-contained resonator with no attached wires and this would be ferrite-less and very strong—encased in ceramic or plastic material for example. The coil 214 would then receive flux from coil 212, causing coil 214 to resonate to then produce a high arching flux allowing power to be coupled from it to pad 220. Resonator coil 214 could in fact be lowered from a car or truck above the roadway and have power transferred to it. As described earlier in this document, apparatus such as actuator 204 may be used to raise or lower the intermediate resonant structure. Moreover, the resonator could be raised from the roadway rather than lowered from the vehicle in some embodiments. The resonator has no attached wires and is simple and low cost—if it gets broken it is easily repaired or replaced. In practice it can skim 50-100 mm above the road using a proximity or boundary layer effect for example to fly at the correct height (for example in the same manner as hard disk drives do). Another resonator on the car can then be coupled to this resonator to give an output at a considerable height above the road if required.

In this way the pad on the road is buried deeply and is more robust, and the pad that is associated with the car is light and takes up almost zero space and only gets lowered to pick-up power when the road surface is appropriate. Broken pads are unlikely but are also low cost, and may be encased in cheap robust materials such as plastics. The intermediate coupler apparatus can alternatively be designed for use with the pad structure of FIGS. 34 and 35, and be designed to take advantage of the fact that a pad as in FIGS. 34 and 35 can be separated into two coils one of which is movable and light.

The pads 212 and/or 214 can be designed to fail in a continuous fashion that does not leave the road littered with chip. Other possibilities also exist. A pad partly lowered from the car can collect flux from a pad on the surface of a road driven by a pad under the road.

Figure 37:
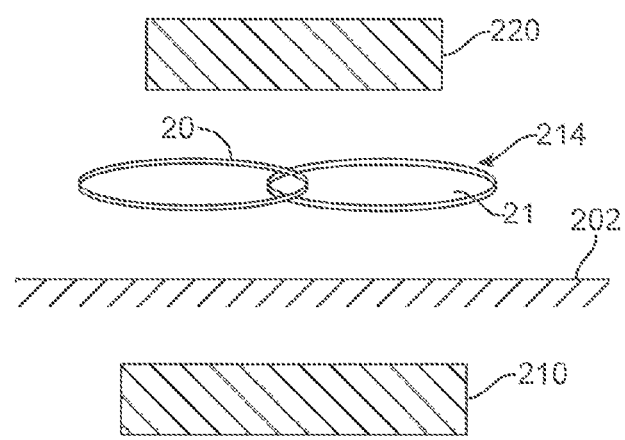
FIG. 37 is a diagrammatic partial cross section of primary, intermediate, and secondary structures according to another disclosed embodiment.

Turning to FIG. 37, another embodiment is shown. In the embodiment, there is a single intermediate structure 214, but those skilled in the art will appreciate that multiple intermediate structures may be used (for example this arrangement or parts of it may be combined with the FIG. 36 arrangement). The structure 214 comprises two or more coils arranged in a layer and with low (i.e. almost zero or ideally zero) mutual coupling, as described with coils 20 and 21 for example of FIG. 8. The coils are tuned and thus act to extend the field as described above. They may also be lowered from a vehicle as described above. This arrangement of coils has the advantage that any one or more of the individual coils 20, 21 etc. may be energised as required depending on the field being produced by the pad structure operating as a primary. Therefore, this arrangement may be used as an intermediate coupler between a wide variety of different flux coupling structures 210 and 220. For example, if a Double D type structure is being used as the primary structure, or if a bipolar pad is operating in Double D (i.e. polarised) mode, then the structure 214 will operate in that mode and act to extend the field. Similarly, other multiple coil structures can be used as intermediate couplers in place of structure 214, such as Double D structures including quadrature coils. For example a multiphase structure in which the coils are arranged in a phase relationship or are configured to operate in a phase relationship, as described elsewhere in this document, may be used. These intermediate structures may be ferrite-less, or contain a selected volume of permeable material.

Of course, in some embodiments only one intermediate coupler may be provided. It will also be seen that these stacked coil arrangements described in this document may be applied in other embodiments to other applications, such as powering personal or mobile electronics devices.

The foregoing describes the invention in broad terms and includes preferred embodiments of the invention. However, modifications and alterations as would be readily apparent to the person skilled in this art are intended to be included within the scope of the invention described in this document.

The invention claimed is:

1. An inductive power transfer flux coupling apparatus, the apparatus comprising:
   a first coil of at least one turn arranged in a first layer, the first coil configured to generate or receive a magnetic coupling flux in a flux coupling region; and
   a second coil of at least one turn and at least part of the second coil being arranged in a second layer, the second coil configured to generate a magnetic flux opposing the flux from the first coil,
   wherein the flux coupling region is on one side of the first coil, and the second coil is provided on the opposite side of the first coil from the flux coupling region.

2. The apparatus as claimed in claim 1 wherein the magnetic flux generated by the second coil shapes the field in the flux coupling region.

3. The apparatus as claimed in claim 1 wherein the magnetic flux generated by the second coil reduces magnetic flux at the side of the apparatus opposite the flux coupling region.

4. The apparatus as claimed in claim 1 wherein the second coil has fewer turns than the first coil.

5. The apparatus as claimed in claim 1 wherein the second coil is shorted.

6. The apparatus as claimed in claim 1 wherein the second coil is driven separately from the first coil.

7. The apparatus as claimed in claim 1 wherein the second coil is connected to the first coil but wound in the opposite direction to the first coil.

8. The apparatus as claimed in claim 1 wherein the apparatus is configured so that the first coil is disposed between the second coil and the surface of a road, and the second coil overlaps the first coil.

9. The apparatus as claimed in claim 1 wherein the first and second coils are stacked, with the first coil arranged in a top layer and the second coil arranged in a lower layer.

10. The apparatus as claimed in claim 1 wherein the second coil is a passive conductor.

11. A method of producing a magnetic flux for inductive power transfer, the method comprising:
    producing a magnetic flux using a first coil to provide magnetic coupling flux;
    using a second coil to produce a magnetic flux which opposes the flux produced by the first coil to thereby control the flux available for power transfer,
    wherein the second coil is used to reflect flux from the first coil into a flux coupling region.

12. The method as claimed in claim 11 wherein the method comprises using the first coil to create a magnetic pole above the surface of a road.

13. The method as claimed in claim 11 wherein the magnetic coupling flux comprises a magnetic pole area that is projected above the surface of a road.

14. The method as claimed in claim 11 wherein the method comprises shorting the second coil.

15. The method as claimed in claim 11 wherein the method comprises electrically connecting the first coil and the second coil.

16. An apparatus comprising a first coil wound in a first direction and configured to generate or receive a magnetic coupling flux in a flux coupling region, and a second coil wound in a second direction and configured to generate a magnetic flux that opposes the flux from the first coil, wherein the first and second coils are stacked, with the first coil arranged in a first layer and the second coil arranged in a second layer, the first layer is disposed between the second layer and the flux coupling region, and the second coil is electrically connected to the first coil.

17. The apparatus as claimed in claim 16, wherein the second coil is wound in the opposite direction to the first coil.

18. The apparatus as claimed in claim 16, wherein the first coil and the second coil are wound with a single conductor.

19. The apparatus as claimed in claim 16, wherein the first coil and the second coil comprise a single winding.

20. The apparatus as claimed in claim 16, wherein the second coil has fewer turns than the first coil.

* * * * *